(12) United States Patent
Simpson et al.

(10) Patent No.: US 11,687,545 B2
(45) Date of Patent: Jun. 27, 2023

(54) CONVERSATION CONTEXT PROFILES FOR USE WITH QUERIES SUBMITTED USING SOCIAL MEDIA

(71) Applicant: VMware, Inc., Palo Alto, CA (US)

(72) Inventors: Glen Robert Simpson, Sunnyvale, CA (US); Didier Giannesini, Eastwood (AU); Clive Ilan Ross, Ashbury (AU)

(73) Assignee: VMWARE, INC., Palo Alto, CA (US)

( * ) Notice: Subject to any disclaimer, the term of this patent is extended or adjusted under 35 U.S.C. 154(b) by 133 days.

(21) Appl. No.: 17/306,822

(22) Filed: May 3, 2021

(65) Prior Publication Data

US 2021/0271673 A1    Sep. 2, 2021

Related U.S. Application Data

(63) Continuation of application No. 14/788,393, filed on Jun. 30, 2015, now abandoned.

(51) Int. Cl.
| | | |
|---|---|---|
| *G06F 16/00* | (2019.01) | |
| *G06F 16/248* | (2019.01) | |
| *H04L 67/306* | (2022.01) | |
| *G06F 16/9535* | (2019.01) | |
| *H04L 51/52* | (2022.01) | |

(52) U.S. Cl.
CPC ........ *G06F 16/248* (2019.01); *G06F 16/9535* (2019.01); *H04L 51/52* (2022.05); *H04L 67/306* (2013.01)

(58) Field of Classification Search
CPC ... G06F 16/248; G06F 16/9535; H04L 51/52; H04L 67/306
See application file for complete search history.

(56) References Cited

U.S. PATENT DOCUMENTS 6,574,628 B1   6/2003  Kahn et al.
6,978,379 B1  12/2005  Goh et al.
(Continued)

OTHER PUBLICATIONS

United States Patent and Trademark Office, "Notice of Allowance," issued in connection with U.S. Appl. No. 14/817,881, dated Sep. 19, 2018, 5 pages.

(Continued)

*Primary Examiner* — Noosha Arjomandi
(74) *Attorney, Agent, or Firm* — Hanley, Flight and Zimmerman, LLC

(57) ABSTRACT

Methods, apparatus, systems, and articles of manufacture are disclosed for conversation context profiles for use with queries submitted using social media. An example apparatus includes at least one memory, instructions, and at least one processor to execute the instructions to identify a first cloud computing resource based on an electronic message including a query, generate a conversation context profile based on overlapping attributes from at least one of a user, group, or service profile associated with the query, generate a search scope of the query to constrain first search information associated with a cloud computing system to the overlapping attributes, in response to determining that the user profile does not include the first cloud computing resource, grant access to at least one of the first cloud computing resource or second search information based on the conversation context profile, and provide one or more search results based on the search scope.

20 Claims, 14 Drawing Sheets

(56) References Cited

U.S. PATENT DOCUMENTS

| | | | |
|---|---|---|---|
| 8,356,067 | B2 | 1/2013 | Trantow |
| 8,521,725 | B1 | 8/2013 | Pearson et al. |
| 8,745,401 | B1 | 6/2014 | Hintz et al. |
| 8,868,590 | B1 | 10/2014 | Donneau-Golencer |
| 8,996,687 | B2 | 3/2015 | Zadig |
| 9,223,852 | B2 | 12/2015 | Lopitaux et al. |
| 9,577,896 | B2 | 2/2017 | Zadig |
| 10,075,442 | B2 | 9/2018 | Simpson et al. |
| 10,250,539 | B2 | 4/2019 | Simpson et al. |
| 10,257,143 | B2* | 4/2019 | Simpson ................ H04L 43/16 |
| 10,467,300 | B1 | 11/2019 | Jastrzebski et al. |
| 10,884,598 | B2* | 1/2021 | Bhatt ..................... G06F 9/451 |
| 11,175,735 | B2* | 11/2021 | Gilra ...................... G06F 3/013 |
| 11,562,510 | B2* | 1/2023 | Dutta ..................... G06F 40/30 |
| 2006/0143057 | A1 | 6/2006 | Sadiq |
| 2008/0046394 | A1 | 2/2008 | Zhou et al. |
| 2011/0202439 | A1 | 8/2011 | Ricci |
| 2011/0276601 | A1 | 11/2011 | Pin et al. |
| 2011/0302098 | A1 | 12/2011 | Yoshida et al. |
| 2012/0116982 | A1 | 5/2012 | Yoshida et al. |
| 2012/0290950 | A1* | 11/2012 | Rapaport ........... H04N 21/8358 715/753 |
| 2012/0310922 | A1 | 12/2012 | Johnson et al. |
| 2013/0091582 | A1 | 4/2013 | Chen et al. |
| 2013/0218885 | A1* | 8/2013 | Satyanarayanan ... G06Q 30/016 707/728 |
| 2013/0262598 | A1 | 10/2013 | Makanawala et al. |
| 2013/0301820 | A1* | 11/2013 | Williams ............ H04M 3/2281 379/201.01 |
| 2014/0041055 | A1 | 2/2014 | Shaffer et al. |
| 2014/0181817 | A1 | 6/2014 | Muller et al. |
| 2014/0244712 | A1* | 8/2014 | Walters .................. G06Q 30/02 709/202 |
| 2014/0245141 | A1 | 8/2014 | Yeh et al. |
| 2014/0280185 | A1 | 9/2014 | Nordstrom |
| 2014/0280595 | A1 | 9/2014 | Mani et al. |
| 2014/0330732 | A1* | 11/2014 | Grignon ................. G06Q 10/06 705/319 |
| 2014/0337914 | A1 | 11/2014 | Canning et al. |
| 2015/0029188 | A1* | 1/2015 | Ege ......................... G06T 17/05 345/420 |
| 2015/0049035 | A1* | 2/2015 | Kim ........................ G06F 3/013 345/173 |
| 2015/0066624 | A1 | 3/2015 | Astore |
| 2015/0127406 | A1 | 5/2015 | Hoen, IV et al. |
| 2015/0161260 | A1 | 6/2015 | Balani et al. |
| 2015/0161560 | A1 | 6/2015 | Burckart et al. |
| 2015/0213083 | A1 | 7/2015 | Brooks et al. |
| 2015/0324933 | A1* | 11/2015 | Allen ................... G06Q 30/0239 705/26.4 |
| 2015/0358303 | A1 | 12/2015 | Hui et al. |
| 2015/0379277 | A1 | 12/2015 | Thota et al. |
| 2016/0021037 | A1 | 1/2016 | Hewitt et al. |
| 2016/0036860 | A1 | 2/2016 | Xing et al. |
| 2016/0094507 | A1 | 3/2016 | Li et al. |
| 2016/0110810 | A1 | 4/2016 | Ashok et al. |
| 2016/0127553 | A1 | 5/2016 | McCormack et al. |
| 2016/0189315 | A1 | 6/2016 | Anania et al. |
| 2016/0226719 | A1 | 8/2016 | Ong et al. |
| 2016/0234250 | A1 | 8/2016 | Ashley et al. |
| 2016/0283983 | A1 | 9/2016 | Kalb et al. |
| 2016/0328758 | A1 | 11/2016 | Rasansky et al. |
| 2016/0380933 | A1* | 12/2016 | Topaltzas .............. H04L 51/214 709/206 |
| 2017/0005967 | A1* | 1/2017 | Simpson .............. G06Q 10/101 |
| 2017/0006032 | A1* | 1/2017 | Simpson ................ H04L 67/10 |
| 2017/0041265 | A1 | 2/2017 | Simpson et al. |
| 2017/0041435 | A1 | 2/2017 | Simpson et al. |
| 2017/0061482 | A1* | 3/2017 | Guo .................... G06Q 30/0255 |
| 2017/0134903 | A1 | 5/2017 | Zadig |
| 2017/0180320 | A1 | 6/2017 | Nimmagadda et al. |
| 2017/0250930 | A1* | 8/2017 | Ben-Itzhak ........... G06F 3/0488 |
| 2018/0063103 | A1 | 3/2018 | Jahid et al. |
| 2018/0063193 | A1 | 3/2018 | Chandrashekhar et al. |
| 2018/0069899 | A1 | 3/2018 | Lang et al. |
| 2018/0137121 | A1 | 5/2018 | Agarwal |
| 2018/0190278 | A1* | 7/2018 | Gupta ..................... G10L 15/22 |
| 2019/0068526 | A1* | 2/2019 | Xie ........................ H04L 67/303 |
| 2019/0190731 | A1* | 6/2019 | Le ........................ H04L 12/1822 |
| 2020/0073509 | A1* | 3/2020 | Shih ........................ G06F 3/017 |
| 2023/0024204 | A1* | 1/2023 | Bingham ................ H04L 51/02 |
| 2023/0025304 | A1* | 1/2023 | Chandrashekar .. G06Q 30/0251 |

OTHER PUBLICATIONS

United States Patent and Trademark Office, "Notice of Allowance," issued in connection with U.S. Appl. No. 14/788,410, dated Oct. 24, 2018, 10 pages.

United States Patent and Trademark Office, "Advisory Action," issued in connection with U.S. Appl. No. 14/788,410, dated Feb. 7, 2018, 2 pages.

United States Patent and Trademark Office, "Non-Final Office Action," issued in connection with U.S. Appl. No. 14/817,899, dated May 9, 2018, 10 pages.

United States Patent and Trademark Office, "Corrected Notice of Allowability" issued in connection with U.S. Appl. No. 14/788,413, dated Aug. 10, 2018, 2 pages.

United States Patent and Trademark Office, "Corrected Notice of Allowability" issued in connection with U.S. Appl. No. 14/788,413, dated Aug. 15, 2018, 2 pages.

United States Patent and Trademark Office, "Advisory Action," dated Apr. 24, 2020 in connection with U.S. Appl. No. 14/817,899, 6 pages.

United States Patent and Trademark Office, "Notice of Allowance," issued in connection with U.S. Appl. No. 14/788,413, dated May 1, 2018, 11 pages.

United States Patent and Trademark Office, "Final Office Action," issued in connection with U.S. Appl. No. 14/817,899, dated Jan. 10, 2019, 12 pages.

United States Patent and Trademark Office, "Non-final Office Action," issued in connection with U.S. Appl. No. 14/788,413, dated Dec. 14, 2016 (10 pages).

United States Patent and Trademark Office, "Final Office Action," issued in connection with U.S. Appl. No. 14/788,410, dated Nov. 16, 2017, 26 pages.

United States Patent and Trademark Office, "Final Office Action," issued in connection with U.S. Appl. No. 14/788,413, dated Nov. 17, 2017, 17 pages.

BMC Software, "Cloud Lifecycle Management Managing Cloud Services from Request to Retirement," 2010 (8 pages).

Gottopati et al., "Finding Relevant Answers in Software Forums," Proceedings of the 26th IEEE/ACM International Conference on Automated Software Engineering (ASE 2011), Nov. 6-10, 2011, (11 pages). Retrieved from the Internet: <URL: http://ink.library.smu.edu.sg/cgi/viewcontent.cgi?article=2400&context=sis_research>.

United States Patent and Trademark Office, "Non-final Office Action," issued in connection with U.S. Appl. No. 14/817,881, dated Apr. 24, 2018, 5 pages.

United States Patent and Trademark Office, "Non-Final Office Action," issued in connection with U.S. Appl. No. 14/788,410, dated Jun. 1, 2017, 17 pages.

United States Patent and Trademark Office, "Non-Final Office Action," issued in connection with U.S. Appl. No. 14/788,413, dated Jun. 5, 2017, 11 pages.

Mell et al., "The NIST Definition of Cloud Computing," NIST Special Publication 800-145, Sep. 2011, 7 pages, [http://nvlpubs.nist.gov/nistpubs/Legacy/SP/nistspecialpublication800-145.pdf].

Lheureux, "Cloud Services Brokerage," 2013, 2 pages, [retrieved from http://www.gartner.com/technology/research/cloud-computing/report/cloud-services-brokerage.jsp].

Forrester Research, "Social Business: Delivering Critical Business Value," A Custom Technology Adaptation Profile Commissioned By VMware, Apr. 2012, 7 pages.

Dancy, "Social IT, People as a Platform," May 2012, 8 pages, [retrieved from http://www.servicesphere.com/blog/2012/5/9/what-is-social-it.html].

(56) References Cited

OTHER PUBLICATIONS

Socialcast, "Socialcast Developer API," retrieved from Internet on Dec. 10, 2011, 136 pages, [retrieved from https://web.archive.org/web/20111210051856/http://socialcast.com/resources/api.html].
Apache Software Foundation, "OpenNLP," 2017, 2 pages, [retrieved from http://opennlp.apache.org/].
Princeton University, "About WordNet," Mar. 17, 2015, 3 pages, [retrieved from http://wordnet.princeton.edu/].
Porter, "The Porter Stemming Algorithm," Jan. 2006, 7 pages, [retrieved from http://tartarus.org/~martin/PorterStemmer/].
Jack of All Clouds, "Anatomy of an Amazon EC2 Re-source ID," Sep. 21, 2009, 8 pages, [retrieved from http://web.archive.org/web/20100314215931/http://www.jackofallclouds.com/2009/09/anatomy-of-an-amazon-ec2-resource-id/].
Rumburg, "Staffing the Desktop Support Function: How Many Technicians Do You Need?" 2012, 5 pages, [retrieved from http://www.servicemanagementfusion.com/conference/~/media/HDIConf/2012/Files/White%20Papers/Rumburg%20-%20Optimal%20Staffing%20Desktop%20Support.pdf].
Dancy "1862 vs. 2013—Form-based Workflow Should be Dead," 2013, 26 pages, [retrieved from https://plus.google.com/110210255323789498026/posts/ VPkAQsfUiPV].
Servicenow, "Social IT," Product Documentation, Oct. 3, 2012, 2 pages, [retrieved from https://wiki.servicenow.com/index.php?title=Social_IT].
IT Smartdesk Ltd., "Product Homepage," 2012, 5 pages, [retrieved from http://web.archive.org/web/20121003153512/http://www.itsmartdesk.com].
Zendesk, "Customer Service Software and Support Ticket System," Product Homepage, 2017, 4 pages, [retrieved from http://www.zendesk.com].
Wikipedia, "Office Assistant," 2013, 7 pages, [retrieved from http://en.wikipedia.org/wiki/Office_Assistant].
EMC Corporation, "EMC Ionix Service Manager Version 9.0—API User Guide," Mar. 2010, 30 pages.
Virtualization Impact, "VMware Socialcast Named IDC's Leader in the Social Enterprise Space," Nov. 6, 2012, 2 pages, [retrieved from http://virtualizationimpact.com/?p=2104].
Rhodes, "Avoiding the War Room," IBM Systems Magazine, Mainframe Edition, Nov. 2010, 3 pages, [retrieved from http://media.bmc.com/edu/BMCWhtppr_Sept_Reprint.pdf].
Salesforce, "Help Desk Software, Customer Service App for Small Businesses," Product Overview, retrieved from Internet on Jun. 19, 2017, 6 pages, [retrieved from http://salesforce.com/products/desk/overview].
Yahoo! Inc., "Yahoo! Answers Homepage," 2017, 2 pages, [retrieved from http://answers.yahoo.com/].
Yelp Inc., "Yelp Homepage," 2017, 4 pages, [retrieved from http://www.yelp.com].
VMware, Inc., "vCloud Automation Center API—6.2.1," VMware vRealize Automation 6.2 Information Center, 65 pages, Apr. 1, 2015, [retrieved from https://pubs.vmware.com/vra-62/index.jsp#com.vmware.vra.restapi.doc/index.html].
United States Patent and Trademark Office, "Non-final Office Action," issued in connection with U.S. Appl. No. 14/788,410, dated Apr. 5, 2018, 30 pages.
Michael Butt, "APM & DevOps: How to Collaborate Effectively with the Virtual War Room," Application Performance Monitoring Blog, Dec. 4, 2014, (5 pages). Retrieved from the Internet: <URL: https://blog.appdynamics.com/devops/get-better-at-devops-with-virtual-war-room/>.
United States Patent and Trademark Office, "Non-Final Office Action," dated Oct. 4, 2019 in connection with U.S. Appl. No. 14/817,899, 13 pages.
United States Patent and Trademark Office, "Final Office Action," dated Feb. 5, 2020 in connection with U.S. Appl. No. 14/817,899, 15 pages.
United States Patent and Trademark Office, "Non-Final Office Action," dated Oct. 10, 2017 in connection with U.S. Appl. No. 14/788,393, 17 pages.
United States Patent and Trademark Office, "Final Office Action," dated Sep. 4, 2019 in connection with U.S. Appl. No. 14/788,393, 18 pages.
United States Patent and Trademark Office, "Non-Final Office Action," dated Aug. 19, 2020 in connection with U.S. Appl. No. 14/788,393, 17 pages.
United States Patent and Trademark Office, "Final Office Action," dated May 3, 2018 in connection with U.S. Appl. No. 14/788,393, 20 pages.
United States Patent and Trademark Office, "Non-Final Office Action," dated Apr. 29, 2020 in connection with U.S. Appl. No. 14/788,393, 19 pages.
United States Patent and Trademark Office, "Non-Final Office Action," dated Feb. 14, 2019 in connection with U.S. Appl. No. 14/788,393, 20 pages.
United States Patent and Trademark Office, "Final Office Action," dated Feb. 2, 2021 in connection with U.S. Appl. No. 14/788,393, 69 pages.

* cited by examiner

| User message | Matching term | Matching keyword |
|---|---|---|
| I want to provision a VM on Amazon | Want | want |
| I can't see my catalog items to import a VM into EC2 | See | search |
| I'm looking for a way to put my application on the cloud | Looking | search |
| I need to set up a machine on AWS, can anyone help? | Need | want |

FIG. 6

CONVERSATION CONTEXT PROFILES FOR USE WITH QUERIES SUBMITTED USING SOCIAL MEDIA

RELATED APPLICATION

This patent arises from a continuation of U.S. patent application Ser. No. 14/788,393, which was filed on Jun. 30, 2015. U.S. patent application Ser. No. 14/788,393 is hereby incorporated herein by reference in its entirety. Priority to U.S. patent application Ser. No. 14/788,393 is hereby claimed.

FIELD OF THE DISCLOSURE

This disclosure relates generally to virtual cloud computing and, more particularly, to allocating, configuring, and maintaining cloud computing resources using social media.

BACKGROUND

In recent years, virtual cloud computing environments have evolved to support centralized data storage and online access to computer services and resources using networks of remote servers hosted on the Internet. Virtual cloud computing has emerged as a vital repository for Information Technology (IT) network administrators overseeing information streams and services within large organizations and companies. Governing users' rights to information, services, and resolving users' complications limit administrators' abilities to manage an increasing workload and provide assistance to a myriad of end users.

BRIEF DESCRIPTION OF THE DRAWINGS

FIG. 6 depicts example messages analyzed using the example natural language processor of FIG. 4.

DETAILED DESCRIPTION

Figure 1:
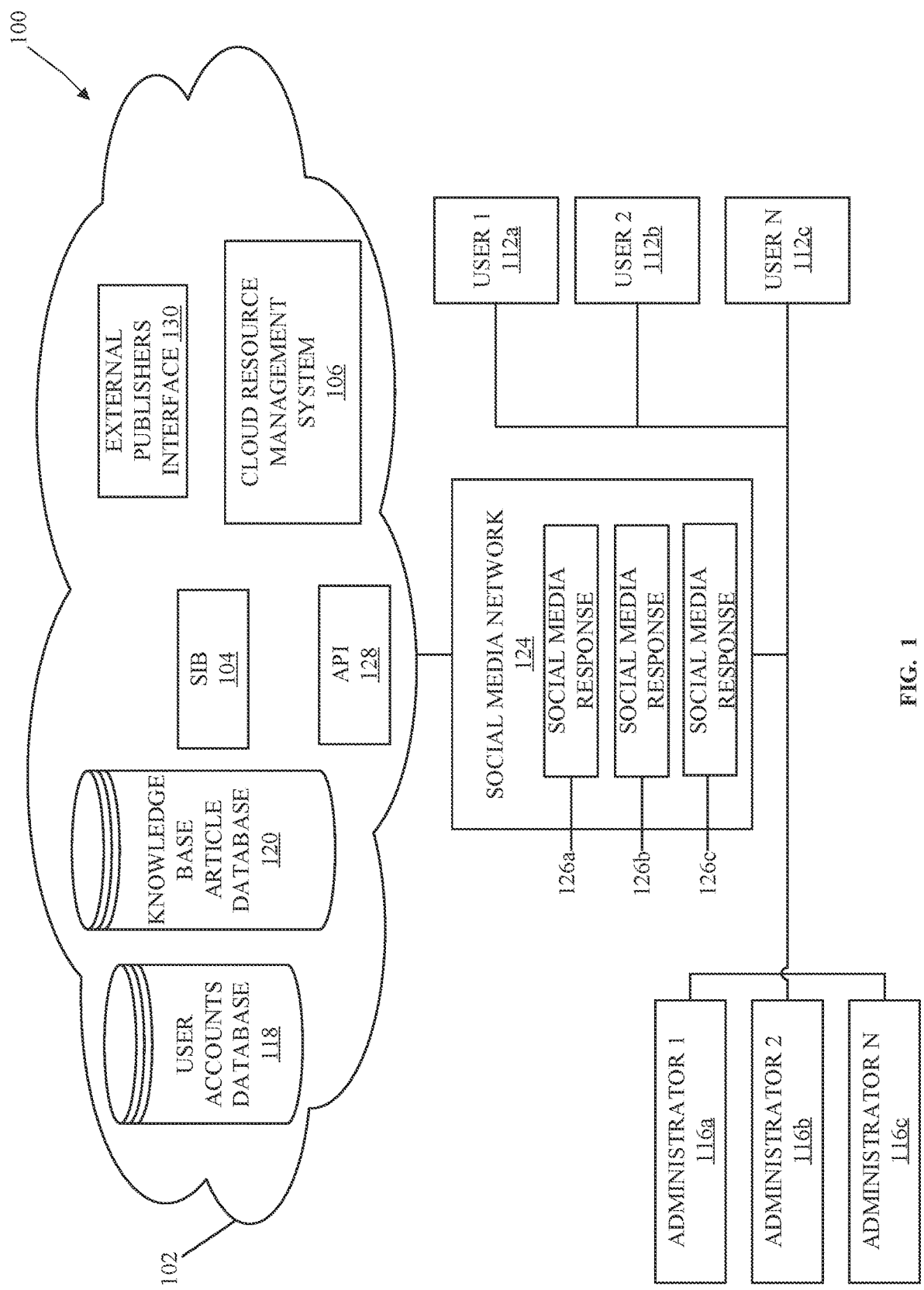
FIG. 1 is an example system that may be used to implement a cloud service provisioning platform using social media services in accordance with the teachings of this disclosure.

Virtual cloud computing uses networks of remote servers, computers and/or computer programs to manage access to centralized resources and/or services, to store, manage, and/or process data. Virtual cloud computing enables businesses and large organizations to scale up IT requirements as demand or business needs increase. Virtual cloud computing relies on sharing resources to achieve coherence and economies of scale over a network. In some example cloud computing environments, an organization may store sensitive client data in-house on a private cloud application, but interconnect to a business intelligence application provided on a public cloud software service. In such examples, a cloud may extend capabilities of an enterprise, for example, to deliver a specific business service through the addition of externally available public cloud services. In some examples, cloud computing permits multiple users to access a single server to retrieve and/or update data without purchasing licenses for different applications.

Prior to cloud computing, as resources and data increased based on increased business needs or demands, computing systems required the addition of significantly more data storage infrastructure. Virtual cloud computing accommodates increases in workflows and data storage demands without significant efforts of adding more hardware infrastructure. For example, businesses may scale data storage allocation in a cloud without purchasing additional infrastructure.

Cloud computing comprises a plurality of key characteristics. First, cloud computing allows software to access application programmable interfaces (APIs) that enable machines to interact with cloud software in the same way that a traditional user interface (e.g., a computer desktop) facilitates interaction between humans and computers. Second, cloud computing enables businesses or large organizations to allocate expenses on an operational basis (e.g., on a per-use basis) rather than a capital basis (e.g., equipment purchases). Costs of operating a business using, for example, cloud computing, are not significantly based on purchasing fixed assets but are instead more based on maintenance of existing infrastructure. Third, cloud computing enables convenient maintenance procedures because computing applications are not installed on individual users' computers but are instead installed at one or more servers forming the cloud service. As such, software can be accessed and maintained from different places (e.g., from an example virtual cloud).

Information technology (IT) is the application of computers and telecommunications equipment to store, retrieve, transmit and/or manipulate data, often in the context of a business or other enterprise. For example, databases store large amounts of data to enable quick and accurate information storage and retrieval. IT service management refers to the activities (e.g., directed by policies, organized and structured in processes and supporting procedures) that are performed by an organization or part of an organization to plan, deliver, operate and control IT services that meet the needs of customers. IT management may, for example, be performed by an IT service provider through a mix of people, processes, and information technology. In some examples, an IT system administrator is a person responsible for the upkeep, configuration, and reliable operation of computer systems; especially multi-user computers, such as servers that seek to ensure uptime, performance, resources, and security of computers meet user needs. For example, an IT system administrator may acquire, install and/or upgrade computer components and software, provide routine automation, maintain security policies, troubleshoot technical issues, and provide assistance to users in an IT network. An enlarged user group and a large number of service requests can quickly overload system administrators and prevent immediate troubleshooting and service provisioning.

Cloud provisioning is the allocation of cloud provider resources to a customer when a cloud provider accepts a request from a customer. For example, the cloud provider creates a corresponding number of virtual machines and allocates resources (e.g., application servers, load balancers, network storage, databases, firewalls, IP addresses, virtual or local area networks, etc.) to support application operation. In some examples, a virtual machine is an emulation of a particular computer system that operates based on a particular computer architecture, while functioning as a real or hypothetical computer. Virtual machine implementations may involve specialized hardware, software, or a combination of both. Example virtual machines allow multiple operating system environments to co-exist on the same primary hard drive and support application provisioning. Before example virtual machines and/or resources are provisioned to users, cloud operators and/or administrators determine which virtual machines and/or resources should be provisioned to support applications requested by users.

Infrastructure-as-a-Service (also commonly referred to as IaaS) generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Administrators and technicians are often expected to answer queries and grant consumer permissions relating to any number of services or pieces of infrastructure dictated by a highly scaled number of consumers. Users, for example, can quickly feel overwhelmed by choices when navigating a service catalog. As such, prior self-service frameworks do not effectively serve users and can be cumbersome or difficult to use even for experienced users. Alternatively, IT networks may contain, for example, issue tracking systems, which are computer software packages that manage and maintain lists of issues experienced by users within an organization. These example issue tracking systems are commonly used in support centers to create, update and resolve customer issues. A support ticket may include vital information related to the account involved and the issue encountered (e.g., urgency, date, detailed description, attempted solutions, etc.). Further, a support ticket within an issue tracking system may, for example, describe a particular problem, maintain the problem's status, and contain other relevant data. Support tickets often require users to enter data via particular user interfaces. The entered data is information that should already be known by the system (e.g., name, address, etc.). In some examples, users are required to know which applications to use and which forms (e.g., predefined ticket fields for specific support requests) are most appropriate, while also navigating fields and validation rules to log tickets and/or to keep track of ticket numbers.

Examples disclosed herein enable reducing the amount of reliance on the user and work needed by the user to interact with a ticket-based system. Although the emergence of cloud computing has permitted IT networks to scale out (e.g., extend services to a myriad of end users), the limited availability of experienced and authorized personnel to facilitate control operations restricts IT networks from scaling out even further. IT networks, in many examples, require experienced and authorized personnel (e.g., an administrator) to manage the system or network, based on user needs. While numerous services are accessible to users via a virtual cloud, diagnosing user issues and managing access to specific services use additional resources than those provided by prior systems.

Examples disclosed herein enable using social media user interfaces to allocate, configure and maintain cloud computing resources. Examples disclosed herein facilitate the deployment of virtual machine resources in cloud computing platforms via social media interfaces. Examples disclosed herein enable performing searches for queries based on conversation context profiles or domains. Conversation context profiles are created based on user, group, and/or service profiles or domains. For example, a user profile or domain contains information that is characteristic of a particular user (e.g., age, job title, type of computer used by a user, type of operating system used by a user, user preferences, etc.).

Group profiles or domains identify groups of users that share similar characteristics and interests. For example, group profiles or domains may include users that use the same operating system (e.g., a Linux group, a Microsoft Windows® operating system group, an OS X group, etc.). A user may be a member of a group profile or domain based on his or her user profile (e.g., a user identified using a Linux operating system may be a member of a Linux group). Service profiles or domains contain information characteristic to particular services. For example, service profiles or domains may identify services that a user is authorized to access, services associated with a particular operating system, services that have been deployed to users via a cloud infrastructure, services designed for specific applications, service consumption or use histories of users and/or groups, etc.

Examples disclosed herein enable generating knowledge base articles based on information-harvesting techniques that use keywords and user-satisfaction indicators to collect information from forums and/or support group message boards associated with users of the same or different social media network and/or social media interface. Such disclosed example information-harvesting techniques can be used to generate knowledge base articles based on previously posted solutions and/or responses so that such knowledge base articles can be subsequently discovered by users in subsequent searches or requests to address relevant questions of users of a cloud computing environment. Examples disclosed herein further enable identifying user-satisfaction indicators (e.g., user-satisfaction information) to determine when users are satisfied or dissatisfied with user-posted responses and/or automated responses that provide solutions and/or search results concerning maintenance and/or allocations of cloud computing resources. In some examples, user-satisfaction indicators may include user-rating information and/or user-acceptance information. User-acceptance information may be indicative of whether users accept, reject, like, endorse, support or appreciate solutions or responses provided in a forum and/or support group (e.g., "recommendations", quantity of clicks on a user-acceptance icon associated with a response, percentage of users that agree with a response or find the response helpful, quantity of user endorsements or user referrals of a response, etc.). User-rating information may be indicative of particular scale-based helpfulness relative to other solutions or responses in a forum and/or support group (e.g., assigning a rating to a response based on a scale from one to ten, applying a multi-star rating to a particular response, etc.). In this manner, a system that can access such user-posted responses and/or automated responses can use the information on satisfaction or dissatisfaction to identify responses that are more likely to satisfactorily address subsequent user-submitted queries from other users experiencing similar or same issues as those associated with the previous responses.

In a cloud computing system users often submit requests to access different resources (e.g., virtual machines, operating systems, servers, etc.). Examples disclosed herein enable a user to submit such a request for a resource via a social media interface. A bot (e.g., an autonomous process, machine, or circuit) of examples disclosed herein receives the request for the resource via the social media interface and uses natural language processing to interpret the request. The bot then determines whether the user is entitled to access the resource based on, for example, the user's profile. If the user is not entitled to access the resource, the bot can inform the user of the denied request. The bot asks the user whether the user would like the system to try and add the resource entitled to the user. If yes, the bot determines whether it can automatically add the entitlement (e.g., based on a pre-defined policy and/or entitlement criteria) or whether the bot needs to escalate the request to an administrator (e.g., a real person). However, in some examples the bot does not inform the user of the denied request nor asks the user whether he or she would like the system to try and add the resources and determines whether it can add the entitlement with or without human involvement The term "entitlement status" as used herein means the eligibility of a user to receive applications, resources and/or information based on one or more permissions. A user's entitlement status may indicate that the user exhibits characteristics necessary for deployment of particular applications, resources, and/or information to that user. A user's entitlement status may be used for security purposes, ensuring certified users are permitted access to particular applications, resources, and/or information while denying uncertified users from such access.

The term "electronic message" as used herein means a search, request, inquiry, question, query, and/or problem submitted by a user and/or an administrator. An electronic message may be in any suitable form including a forum post, a message board post, a support group post, an instant message, an SMS text message, etc. An electronic message may be posted to a forum and/or support group of a social media network. An electronic message may be a response generated by the example system to address a user and/or administrator submitted search, request, inquiry, question, query and/or problem.

The term "ticket information" as used herein means information characteristic of IT-related issues in, for example, user-submitted tickets for requesting IT services. Ticket information includes, for example, urgency assessment of a problem, date, detailed description, attempted solutions, etc.

The term "cloud computing system" as used herein refers to data repositories storing services, resources, information, and/or applications. An example cloud computing system may be referred to as a cloud computing environment. An example cloud computing system 102 of FIG. 1 includes an example cloud resource management system 106, an example knowledge base article database 120, an example user accounts database 118, an example SIB 104, and an example external publishers interface 130 of FIG. 1.

The term "user attributes" as used herein refers to information characterizing a user, including, for example, job title, company ranking, age, sex, department category, computer number, operating system, ticket history, ticket status, conversation history, etc. User attributes may be indicated in user profiles.

The term "group attributes" as used herein refers to information characterizing a group or collection of users based on, for example, use of the same operating systems, use of the same applications, use of the same computing resources, similar service request histories, similar resource and/or information consumption/use histories (e.g., duration of resource and/or information use, whether a resource and/or information was actually used, and the frequency of resource and/or information use), etc. Group attributes may be indicated in group profiles.

The term "service attributes" as used herein refers to information characterizing services such as, for example, operating system compatibility information, status information indicative of whether a service has been deployed to a user, application purpose and functionality information, cost and performance metrics, underlying resources necessary for service(s) operations, etc. Service attributes may be indicated in service profiles.

The term "applications" as used herein refers to one or more executable programs and/or their dependent middleware and/or operating systems.

The term "resources" as used herein refers to physical resources and/or virtual resources (e.g., logical resources). Virtual resources, include, for example, virtual machines, load balancers, etc. that may be accessed by the cloud computing system and/or other programs, software, devices, etc. Physical resources include, for example, servers, computers, printers, routers, switches, or other hardware that may be used to provide computing and/or communication capabilities.

The term "conversation context profile" as used herein refers to background information used to interpret and respond to electronic messages. Conversation context profiles may include user, group, and service attributes associated with user, group, and service profiles, respectively, influence interpretation of electronic messages, and consolidate searches for application, resources, and/or information.

The term "entitlements" as used herein refers users' rights, permissions, and/or authorizations to access applications, resources, and/or services. For example, entitlements determine which users and groups can request specific catalog items or perform specific actions. In some examples, entitlements may be specific to a business group.

The term "non-entitlements" as used herein refers insufficient rights, permissions, and/or authorizations of users to access applications, resources, and/or information.

Examples disclosed herein may be implemented in connection with cloud computing environments that use virtual machines and/or containers. A virtual machine is a data computer node that operates with its own guest operating system on a host using resources of the host virtualized by virtualization software. A container is a data computer node that runs on top of a host operating system without the need for a hypervisor or separate operating system.

FIG. 1 depicts an example system 100 that enables users to request access to cloud computing resources and/or request information about cloud computing resources via social media user interfaces. The example system 100 includes an example cloud computing system 102 and an example social media network 124. The example cloud computing system 102 manages information about cloud computing resources that may be allocated to users 112*a*, 112*b*, 112*c* (e.g., cloud computing service customers, computer users, application developers, etc.). In addition, the example cloud computing system 102 manages information that may be accessed by the users 112*a-c* about cloud computing resources. For example, the cloud computing system 102 may maintain and/or manage user profiles (e.g., in user accounts) of the users 112*a-c*. In examples disclosed herein, the user profiles are indicative of cloud resources allocated to the users 112*a-c* and/or identify entitlements indicative of cloud computing resources that the users 112*a-c* are entitled to access. In examples disclosed herein, the cloud computing system 102 allocates resources to ones of the users 112*a-c* based on user requests including requests for such resources. In addition, the example cloud computing system 102 provides users 112*a-c* with access to information about cloud computing resources. The information may be in the form of knowledge base articles, operating manuals, forum messages, and/or any other information pertinent to a user-submitted query related to computing resources managed and allocated by the cloud computing system 102. Also in examples disclosed herein, the example cloud computing system 102 accesses messages posted on user forums related to computing resources managed and allocated by the cloud computing system 102 and provides the users 112*a-c* with access to such forum messages.

To facilitate request-submission processes or query-submission processes by the users 112*a-c*, the example system 100 is provided with an example social media network 124. The example social media network 124 provides a social media user interface or different types of social media user interfaces to enable the users 112*a-c* to submit requests or queries to the example cloud computing system 102. For example, user-submitted requests may be requests to access one or more cloud computing resources. For example, if a user 112*a-c* desires access to a virtual machine with a particular operating system, the user 112*a-c* can submit a request via the social media network 124 asking in natural language or plain language that the user 112*a-c* would like access to the desired virtual machine and operating system. User-submitted queries may be used by users 112*a-c* to request information about cloud computing resources. For example, a user 112*a-c* desiring information about the operability of a particular feature of a cloud computing resource may submit a query identifying the circumstances surrounding the user's 112*a-c* desire to obtain such information. In examples disclosed herein, information may be requested in the user-submitted queries by plainly asking for the information such as "I would like an operating manual for my operating system." Alternatively, information may be requested in user-submitted queries by describing a problem experienced with a cloud computing resource such as "I am having difficulty booting my operating system." In any case, the example social media network 124 enables the users 112*a-c* to post messages or send instant messages to the example cloud computing system 102 in a natural language style (e.g., in a colloquial, plain-language format). The cloud computing system 102 of the illustrated example interprets user-requests or user-queries in the messages to provide the requesting users 112*a-c* with the requested resource allocations and/or desired information.

In the illustrated example, a cloud computing service provider that runs the example system 100 may employ numerous administrators 116*a-c* (e.g., people that manage the cloud computing system 102 and that have relatively more technical knowledge of cloud computing resources than an average user such as the users 112*a-c*) to implement and/or oversee management of cloud services, cloud computing resources, and information offered by the example cloud computing system 102. For example, the administrators 116*a-c* may manage aspects of allocating cloud computing resources and/or may interact with the users 112*a-c* via the social media network 124 to provide assistance related to using cloud computing resources.

Some examples disclosed herein enable performing context-based searches for user queries submitted by the users 112*a-c* via the social media network 124. For example, a user 112*a-c* may submit a user-submitted query to the social media network 124 using a type of social media message (e.g., a message board, a chat session, etc.). In such examples, the cloud computing system 102 uses natural language processing to interpret the user-submitted query and perform a search on information accessible to the cloud computing system 102 that is within the scope of a conversation context of the user-submitted query. For example, if the user is entitled to access information about operating systems running on virtual machines, and the user 112*a-c* posted the user-submitted query in a Microsoft Windows® operating system message forum, the scope of the conversation context includes any information about virtual machines running a Microsoft Windows® operating system. In such examples, the scope of the conversation context excludes information about UNIX® operating system platforms. As such, when the user 112*a-c* submits a user-submitted query stating, "My OS will not boot," the cloud computing system 102 uses natural language processing to determine that the "OS" term in the user-submitted query refers to Microsoft Windows® operating system, not UNIX® operating system, because the user-submitted query was posted to a Microsoft Windows® operating system message forum via the social media network 124. In addition, the example cloud computing system 102 understands that the user-submitted query is within the context of virtual machines because the cloud computing system 102 uses a user profile of the submitting user to determine that the user 112*a-c* is authorized to access virtual machines. In some examples, even if the user did mean "Unix OS," the cloud computing system 102 does not provide the user access to any UNIX® operating system information if the user profile of the submitting user 112*a-c* does not indicate that the user is entitled to access UNIX® operating system resources or information.

Some examples disclosed herein enable generating knowledge base articles based on forum messages that have relatively high user-satisfaction indicators by the users 112a-c. For example, in a forum message board accessible by the cloud computing system 102, the users 102a-c post messages about technical problems they encounter with network resources. Others of the users 102a-c then reply to the posted messages offering advice or solutions. When the one of the users 102a-c that submitted the initial question or message reads the responses, the example social media network 124 enables the user to provide user-acceptance indications for the responses by marking the responses as helpful or not helpful. In some examples, the social media network 124 additionally or alternatively enables the user 112a-c to provide user-ratings for the responses by providing a scale-based rating (e.g., a five-star scale, a scale of one to ten, etc.) based on the perceived helpfulness of each response. The example cloud computing system 102 analyzes user-acceptance indications and/or user-rating indications of responses to identify suitably helpful responses from which to generate knowledge base articles. For example, the cloud computing system 102 compares user-satisfaction indicators of responses against a threshold. If a response in a forum message satisfies the threshold, the example cloud computing system 102 generates a knowledge base article based on that response.

Some examples disclosed herein enable an autonomous computer-executable process to determine when the users 112a-c are authorized to access requested cloud computing resources, when unauthorized ones of the users 112a-c can be automatically granted access rights to cloud computing resources without seeking human intervention by one of the administrators 116a-c, and when requests for access authorization need to be escalated to the administrators 116a-c for human intervention to grant access rights to cloud computing resources. For example, the users 112a-c may submit requests to access different resources (e.g., virtual machines, operating systems, servers, etc.). The example cloud computing system 102 enables a user 112a-c to submit such a request for a resource via a social media interface of the social media network 124. The example cloud computing system 102 uses natural language processing to interpret the user-submitted request. The example cloud computing system 102 determines whether the user 112a-c is entitled to access the requested resource based on, for example, the user's profile. If the user 112a-c is not entitled to access the resource, the example cloud computing system 102 can inform the user of the denied request. In some examples, the cloud computing system 102 also asks the user whether the user would like the system to try and add the resource entitlement to the user 112a-c. If yes, the example cloud computing system 102 determines whether it can automatically add the entitlement (e.g., based on some entitlement criteria) or whether the request for access authorization needs to be escalated to an administrator 116a-c.

The example social media network 124 of FIG. 1 may be implemented using any one or more suitable type(s) of forum platforms or social media network platforms (e.g., VMware Socialcast, etc.). In the illustrated example of FIG. 1, the users 112a-c and the administrators 116a-c may submit electronic messages directed to forums and/or support groups via the social media network 124. In some examples, the forums and/or support groups serve as message boards and/or discussion interfaces that enable the users 112a-c to converse with other ones of the users 112a-c, administrators 116a-c, and the example cloud computing system 102 via electronic messages. Forums and/or support groups may be partitioned by topic or shared user interests. For example, members of a Linux support group may include ones of the users 112a-c sharing similar interests in Linux applications. Additionally, the users 112a-c and the administrators 116a-c may submit electronic messages directed to forums and/or support groups via the same or different social media interface(s). For example, a user 112a-c may post an electronic message to a forum and/or support group via a VMware Socialcast interface and/or via a different social media interface including short messaging service (SMS), email, etc. Peers (e.g., other users 112a-c in the example system 100) within a particular forum and/or support group, using a same or a different social media interface than the social media interface used by the originally posting one of the users 112a-c that submitted the electronic message, may read and respond to the electronic message by providing feedback (e.g., solutions, advice, recommendations, guidance, etc.) in the forum and/or support group via social media messaging.

Responses to electronic messages posted in forums and/or support groups via the example social media network 124 are disclosed herein as example social media responses 126a-c illustrated in FIG. 1. In the illustrated example, the social media responses 126a-c provide solutions, advice, recommendations, or guidance to user-posted questions. In some examples, peers review electronic messages posted by a user 112a-c, or conversation threads posted by multiple users 112a-c, to a forum and/or support group and subsequently post social media responses 126a-c to suggest solutions to problems experienced by other users 112a-c. For example, if a user 112a-c submits an electronic message to a Microsoft Windows® operating system support group via the social media network 124 to inquire about virtual machines with a Microsoft Windows® operating system, the social media network 124 sends, forwards or provides (e.g., unicast, multicast, broadcast, posted, etc.) the electronic message to members of the Microsoft Windows® operating system support group in the same or different social media network 124. In such examples, a peer or plurality of peers in the Microsoft Windows® operating system support group may respond to the electronic message via social media responses 126a-c, providing information or suggestions related to virtual machines with Microsoft Windows® operating systems.

The example cloud computing system 102 includes an example social integration bot (SIB) 104, an example user accounts database 118, an example knowledge base article database 120, an example application programming interface (API) 128, an example cloud resource management system 106, and an example external publishers interface 130.

The example SIB 104 is a processing unit that executes instructions or otherwise performs operations to find information, resources and applications within different scopes of conversation context profiles or domains associated with different ones of the user 112a-c and/or associated with characteristics of messages posted by the users 112a-c. The SIB 104 of the illustrated example is an autonomous process, machine, and/or circuit that performs operations based on computer-executable instructions and/or logic circuits. The example SIB 104 reads electronic messages posted in instant message (IM) chat sessions, to forums and/or to support group message boards by users 112a-c and/or the administrators 116a-c via the social media network 124. The example SIB 104 processes electronic messages posted to IM chat sessions, forums and/or support groups and subsequently replies by posting automated, electronic messages to the IM chat sessions, forums and/or support groups. Additionally, the example SIB 104 determines whether social media responses 126a-c posted to forums and/or support groups have sufficiently high user-satisfaction indicators (e.g., user-acceptance indications and/or user-rating indications that satisfy a threshold) to use as the basis for generating knowledge base articles. The example SIB 104 may generate knowledge base articles based on one or more of the social media responses 126a-c determined to have sufficiently high user-satisfaction indicators. In the illustrated example, the knowledge base article database 120 saves knowledge base articles. In this manner, the SIB 104 may subsequently provide the users 112a-c knowledge base articles from the knowledge base article database 120 when the example SIB 104 determines that such knowledge base articles are relevant to queries submitted by the users 112a-c via the social media network 124.

In examples disclosed herein, the SIB 104 manages forums and/or support group message boards and may archive conversation history. In some examples, the example SIB 104 reads electronic messages submitted by the users 112a-c via a VMware Socialcast interface and/or via a different social media interface including short messaging service (SMS), email, etc. The example SIB 104 arbitrates whether access to resources, services, and/or information can be automatically granted to the users 112a-c without human-administrator intervention or whether human involvement is needed to process and grant/deny such access requests. Additionally, the example SIB 104 automatically logs and stores ticket information. The example SIB 104 may analyze, monitor, and/or extract information from electronic message exchanges with the users 112a-c to log IT-related ticket information. In some examples, the example SIB 104 may query users 112a-c for ticket information and log tickets based on responses provided by the users 112a-c. In some examples, the SIB 104 logs ticket information by querying the users 112a-c for ticket information, without querying the users 112a-c for the same ticket information twice. The example SIB 104 is discussed in more detail below in connection with FIG. 3.

The example cloud resource management system 106 of the cloud computing system 102 manages cloud computing platforms. For example, the cloud resource management system 106 automatically allocates and provisions applications and/or resources to the users 112a-c and/or to the example administrators 116a-c. In some examples, the cloud resource management system 106 may be implemented using a vRealize Automation system and/or a vRealize Operations system developed and sold by VMware, Inc. In other examples, any other suitable cloud computing platform may be used to implement the cloud resource management system 106. The example cloud resource management system 106 of the illustrated example may automatically provision applications and/or resources from an application and/or resource catalog. In some examples, the example SIB 104 reads electronic messages posted to forums and/or support group message boards via the social media interface 124 and identifies applications and/or resources in the cloud resource management system 106 that satisfy a user-submitted request. In other examples, the example SIB 104 reads electronic messages posted to forums and/or support group message boards via the social media interface 124 and subsequently instructs the example cloud resource management system 106 to provision applications and/or resources to ones of the users 112a-c and/or the administrators 116a-c. For example, if an example user 112a-c posts an electronic message to a Linux support group message board via the social media network 124 to request a Linux virtual machine, the example SIB 104 may read the electronic message and instruct the example cloud resource management system 106 to provision the virtual machine to the user 112a-c. The example cloud resource management system 106 is discussed in greater detail below in connection with FIG. 2.

The example API 128 enables the SIB 104 to communicate with the social media network 124 to access and/or read electronic messages posted by the users 112a-c and/or by the administrators 116a-c via the social media network 124. For example, the API 128 provides communication compatibility between different types of social media networks 124 running on a same or different operating system(s). In the illustrated example, the API 128 is a representational state transfer (REST) API that communicates using the Hypertext Transfer Protocol (HTTP) to retrieve and send data between the SIB 104 and the social media network 124. The example API 128 also enables the SIB 104 to communicate with external publishers via the example external publishers interface 130 and the example cloud resource management system 106. The example API 128 further enables the users 112a-c and the administrators 116a-c to access applications and/or resources from the example cloud resource management system 106.

Publishers accessible via the example external publishers interface 130 may be third-party cloud service providers that provide applications and/or resources to the cloud resource management system 106. For example, external publishers may use the external publishers interface 130 to provide applications and/or resources to the cloud resource management system 106 that are not currently available in an example application and/or resource catalog (e.g., an example catalog 230 of FIG. 2). In this manner, by allowing the example external publishers to supplement the cloud resource management system 106 and/or to contribute additional applications and/or resources, the example cloud computing system 102 operates as a cloud service broker. Allowing external publishers to supplement the cloud resource management system 106 with applications and/or resources using examples disclosed herein facilitates expanding the scope of services in the example cloud computing system 102. Expanding the scope of services in the example cloud computing system 102 in this manner facilitates scaling up the example system 100 to assist more users 112a-c having different needs and/or profiles corresponding to different types of resources and/or applications. Over time, as the cloud resource management system 106 expands in scope, the need for human involvement by the administrator 116a-c decreases.

The example user accounts database 118 stores conversation context profiles, user profiles, group profiles, service profiles, ticket logging information, and/or archived social media message history between the users 112a-c, the administrators 116a-c, and/or the SIB 104.

The example knowledge base article database 120 stores knowledge base articles. In examples disclosed herein, the knowledge base article database 120 stores some of the social media responses 126a-c as knowledge base articles when such responses 126a-c are determined to be relevant to frequently asked questions or problems and/or have high user-satisfaction indicators. The example knowledge base article database 120 is an evolving repository containing solutions and/or answers to questions that are likely of interest to ones of the users 112a-c. In some examples, the knowledge base articles stored in the knowledge base article database 120 address questions previously submitted by ones of the users 112a-c. The repository grows with more solutions and answers as more of the users 112a-c participate in social media messaging interactions to discuss problems and possible solutions. Over time, as the knowledge base article database 120 expands in scope, the need for human involvement by the administrators 116a-c to provide assistance, solutions, and/or answers to users 112a-c decreases.

In some examples, a peer replies to an electronic message and provides a social media response 126a-c that supplies significantly helpful instructions to solve a problem. However, if the social media response 126a-c is not associated with any user-satisfaction indicators (e.g., no peers have reviewed the social media response 126a-c nor provided user-satisfaction indicators), the user 112a-c that submitted the electronic message may benefit from reviewing the social media response 126a-c in a forum and/or support group, but the social media response 126a-c is not saved as a knowledge base article until the example SIB 104 determines one or more user-satisfaction indicators of the social media response 126a-c satisfies a performance threshold. The performance threshold may require that user-satisfaction indicators associated with the social media responses 126a-c satisfy a minimum user-satisfaction level before the SIB 104 proceeds to generate a knowledge base article based on the social media response 126a-c for storing in the knowledge base article database 120.

In some examples, the example system 100 of FIG. 1 may operate as follows. An example user 112a-c submits a user query or user request in an electronic message to a forum and/or support group message board via the social media network 124 using a laptop, mobile device, desktop, or any other suitable device operating on a Microsoft Windows® operating system, a MAC OS, an Apple iOS, or any other suitable operating system. In the illustrated example, the user-submitted electronic message is directed to, accessible, and/or readable by members of one or more forums and/or support group message boards using the same and/or different social media network 124. In the illustrated example, the user-submitted electronic message is also accessible and readable by the example SIB 104 in the example cloud computing system 102. In some examples, the SIB 104 processes the electronic message and accesses the cloud resource management system 106. The example SIB 104 may identify a relevant application and/or resource in the cloud resource management system 106 and provision applications and/or resources to the example user 112a-c. In other examples, the SIB 104 determines an entitlement status of an inquiring user to access different applications, information, and/or resources. In some examples, the SIB 104 determines that applications and/or resources in the example cloud resource management system 106 do not provide solutions to the electronic message. In any case, regardless of whether the SIB 104 finds useful applications or resources in the cloud resource management system 106, the example SIB 104 also searches the example knowledge base article database 120 for knowledge base articles that are relevant to the user-submitted electronic message.

Figure 2:
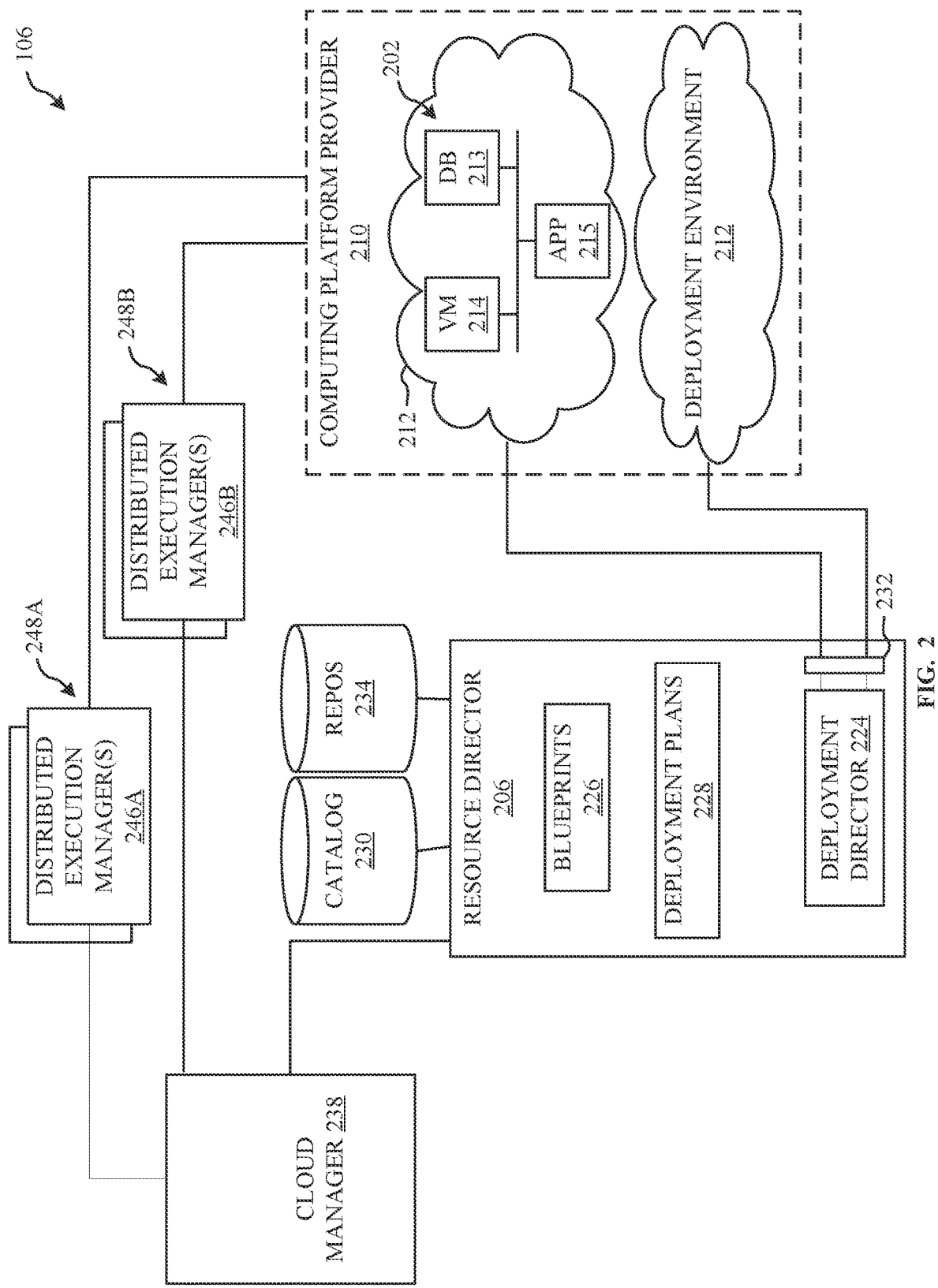
FIG. 2 is an illustration of the example cloud resource management system of FIG. 1.

The example cloud resource management system 106 may be implemented as illustrated in FIG. 2. The example cloud resource management system 106 includes an example resource director 206 and an example cloud manager 238 to manage an example cloud computing platform provider 210. The example cloud computing platform provider 210 provides numerous cloud computing resources 202. The cloud computing resources 202 of the illustrated example include example databases (DBs) 213, example virtual machines (VMs) 214, and example applications (apps) 215. In other examples, the cloud computing resources 202 may include other types of resources instead of or in addition to those shown in FIG. 2. The example DBs 213 may be used to provide different types of storage and retrieval repositories for data. The example VMs 214 of FIG. 2 may be configured to provide different amounts of compute power and/or storage. In some examples, services executing on the example VMs 214 may have dependencies on other ones of the VMs 214. The example applications 215 may provide different types of services for use by the users 112a-c and/or administrators 116a-c of FIG. 1 such as word processor programs, spreadsheets, web servers, etc.

The example cloud resource management system 106 may provide multiple deployment environments 212 such as development environments, testing environments, staging environments, and/or production environments for running the cloud computing resources 202. The example users 112a-c, the example administrators 116a-c, the example SIB 104, and/or programs or devices may access the cloud computing resources 202 of the cloud computing environment platform provider 210, via REST (Representational State Transfer) APIs (Application Programming Interface) and/or via any other client-server communication protocol. The example cloud computing platform provider 210 provisions the computing resources 202 to provide an example deployment environment 212 (e.g., a testing environment, a staging environment, a production environment) in which a user 112a-c such as, for example, a software developer, can deploy or receive application(s).

The example resource director 206 of FIG. 2 may be implemented using VMware vCloud® Director and may be run on one or more virtual machines. The example resource director 206 of FIG. 2 manages deployments of the cloud computing resources 202 onto one or more of the example deployment environments 212. For example, the resource director 206 generates example blueprints 226 that specify logical topologies of applications to be deployed. For example, to deploy an application 215, the example blueprints 226 generally capture the structure of the application 215 as a collection of application components executing on virtual computing resources (e.g., one or more of the VMs 214). For example, a blueprint 226 may specify a web application (e.g., in the form of a Java web application archive or "WAR" file comprising dynamic web pages, static web pages, Java servlets, Java classes, and/or other property, configuration and/or resource files that make up a Java web application) executing on an application server (e.g., Apache Tomcat application server) on a virtual machine 214 that uses a database 213 as a data store. In the illustrated example, the resource director 206 generates the example blueprints 226 based on items (e.g., templates) available in an example catalog 230. The example catalog 230 is a listing of available virtual computing resources (e.g., virtual machines, networking resources, storage, etc.) that may be provisioned by the cloud computing platform provider 210 and available application 215 (e.g., software services, scripts, code components, application-specific packages) that may be installed on one or more of the virtual machines 214.

The example resource director 206 also generates example deployment plans 228 based on deployment settings indicated in the blueprints 226 (e.g., virtual computing resources' cluster size, CPU, memory, networks) and based on an execution plan of tasks having a specified order in which cloud computing resources 202 are provisioned and application components are installed, configured and started.

The example deployment director 224 executes the example deployment plans 228 by communicating with the cloud computing platform provider 210 via an example cloud interface 232 to provision and configure the cloud computing resources 202 in the deployment environment 212. For example, a task may be a script that, when executed by a virtual machine 214, causes the virtual machine 214 to retrieve and install particular software packages from a central package repository 234. After the cloud computing resources 202 have been deployed, the example resource director 206 may be utilized to monitor and/or modify (e.g., scale) the deployment.

The example cloud manager 238 of FIG. 2 interacts with the components of the cloud resource management system 106 (e.g., the resource director 206 and the cloud computing platform provider 210) to facilitate management of the resources 202 of the cloud computing platform provider 210. The example cloud manager 238 annotates the example blueprints 226 to control how workflows associated with the blueprints 226 are executed. A workflow is a series of actions and decisions to be executed in a virtual computing platform. The example cloud resource management system 106 includes first and second distributed execution managers (DEMs) 246A and 246B to execute workflows. The first DEM 246A includes a first set of characteristics and is physically located at a first location 248A. The second DEM 246B includes a second set of characteristics and is physically located at a second location 248B. The example DEMs may contact the example cloud manager 238 when they are available for executing workflows. In examples disclosed herein, the example SIB 104 communicates with the cloud manager 238 to allow the SIB 104 to select desired ones of the blueprints 226 for allocating, provisioning, and/or deploying resources in response to user requests.

Figure 3:
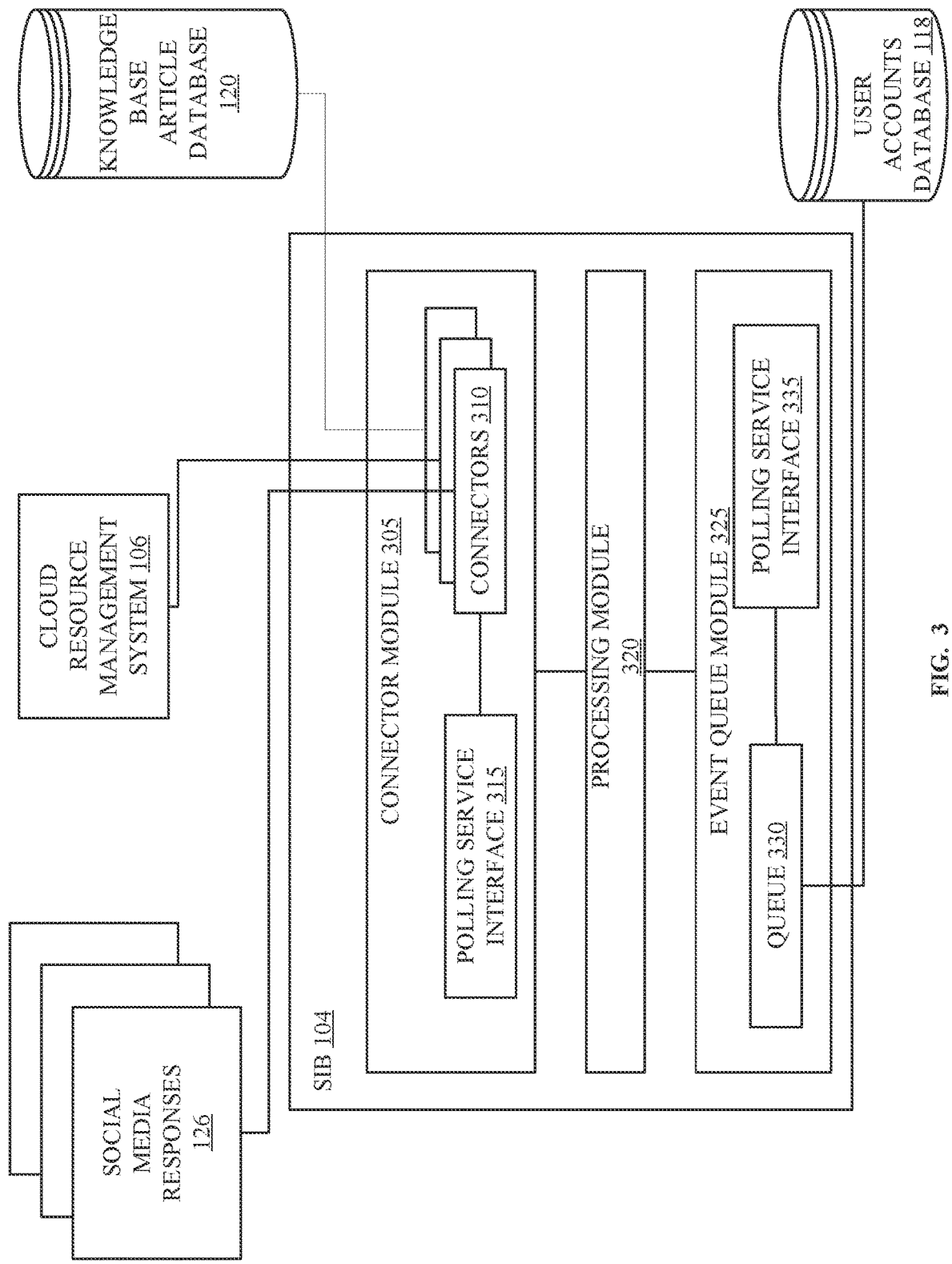
FIG. 3 is an illustration of the example social integration bot (SIB) of the example system of FIG. 1.

FIG. 3 depicts an example processing architecture of the example SIB 104 of the example system 100 of FIG. 1. The example SIB 104 interacts with the example cloud resource management system 106 and the example social media network 124 and performs actions based on user-submitted messages. By processing user-submitted messages using the SIB 104, network traffic is more efficiently handled than prior systems that use human intervention by administrators to process all user-submitted messages. In the illustrated example of FIG. 3, the example SIB 104 includes an example connector module 305, an example processing module 320, and an example event queue module 325.

The example connector module 305 interfaces with the cloud resource management system 106 and with the example social media network 124. The example connector module 305 is provided to access raw data (e.g., text) in social media responses 126a-c and to communicate with components of the example cloud computing system 102. For example, the connector module 305 can access data in social media responses 126a-c and/or send messages to the social media network 124. The example connector module 305 includes example connectors 310 that temporarily store data and facilitate communications between the example API 128 (FIG. 1) and the example processing module 320. In the illustrated example, the connector module 305 polls components of the cloud computing system 102 from time to time, utilizing an example polling service interface 315 illustrated in FIG. 3. For example, the polling service interface 315 may poll the knowledge base article database 120 and the cloud resource management system 106 to continuously check for resources and/or information requested via user-submitted electronic messages.

The example processing module 320 performs actions based on user-submitted messages. The example processing module 320 determines which keywords provided or entered by users 112a-c via an electronic messages should be used to identify conversation context profiles for processing queries or requests made by the users 112a-c. The combination of user-submitted electronic messages and outgoing messages generated by the example SIB 104 are disclosed herein as conversational workflows. When the example SIB 104 fills a ticket form for a particular issue, the example processing module 320 analyzes and extracts ticket information from conversational workflows between the user 112a-c and the SIB 104. The example processing module 320 may, in other examples, perform searches to find information based conversation context profiles, generate knowledge base articles based on social media responses 126a-c, and/or arbitrate whether user authorization to access certain resources or information can be automatically granted or whether human involvement is necessary to grant such authorization. An example architecture of the example processing module 320 is described below in connection with the illustrated example of FIG. 4.

The example event queue module 325 enables efficient processing of data requests and network traffic without significant decreases in the performance of the virtual machine(s) running the SIB 104. The example event queue module 325 includes an example queue 330. The example queue 330 includes lists of data, commands, etc. received from the example user accounts database 118 and/or the example processing module 320. The lists of data, commands, etc. are temporarily stored in the example queue 330 before and after the processing module 320 processes the data, commands, etc. The lists of data, commands, etc. are to be retrievable in a defined or undefined order and implemented, for example, as a circular buffer, first-in-first-out buffer (e.g., FIFO), etc. In some examples, the example event queue module 325 organizes data processing requests into incoming and outgoing requests to facilitate multiple virtual machines to process the same example queue 330. In this manner, by using numerous virtual machines to process a queue at the same time, network traffic can be substantially decreased, thus making more network bandwidth available for other communications, and preventing virtual machines from acquiring resources at the expense of other virtual machines. Conversational workflows are configured to increase network traffic at any point in time. As such, using the event queue module 325 to separate incoming network traffic from outgoing network traffic facilitates scalability in an application by supporting simultaneous allocation of resources by virtual machines and preventing certain virtual machines from allocating resources at the expense of other virtual machines. Use of social media often results in the generation of many messages in a short period of time. To manage high volumes of messages, the example queue 330 facilitates quickly processing the messages during high-volume message periods. The example queue 330 may be implemented using a non-volatile memory to facilitate storing unprocessed data in the event of a system failure. In this manner, such unprocessed data does not have to be re-accessed from the example user accounts database 118.

The example event queue module 325 also includes a polling service interface 335 to poll the example user accounts database 118. In examples disclosed herein, the example queue 330 facilitates access to different messages and performs simple maintenance, testing, debugging, and scaling out operations to support more users 112a-c, databases 213, virtual machines 214, applications 215, and/or other cloud computing resources 202. In some examples, the queue 330 works complementary with the example user accounts database 118 and serves to handle high-volume asynchronous processing. Example open standard protocols for message queues, which may be used to facilitate operation of the example queue 330 include the advanced message queueing protocol (AMQP) and the streaming text oriented messaging protocol (STOMP). In some examples, the different types of protocols are concurrently used to store messages or information in different ways in the example queue 330.

Figure 4:
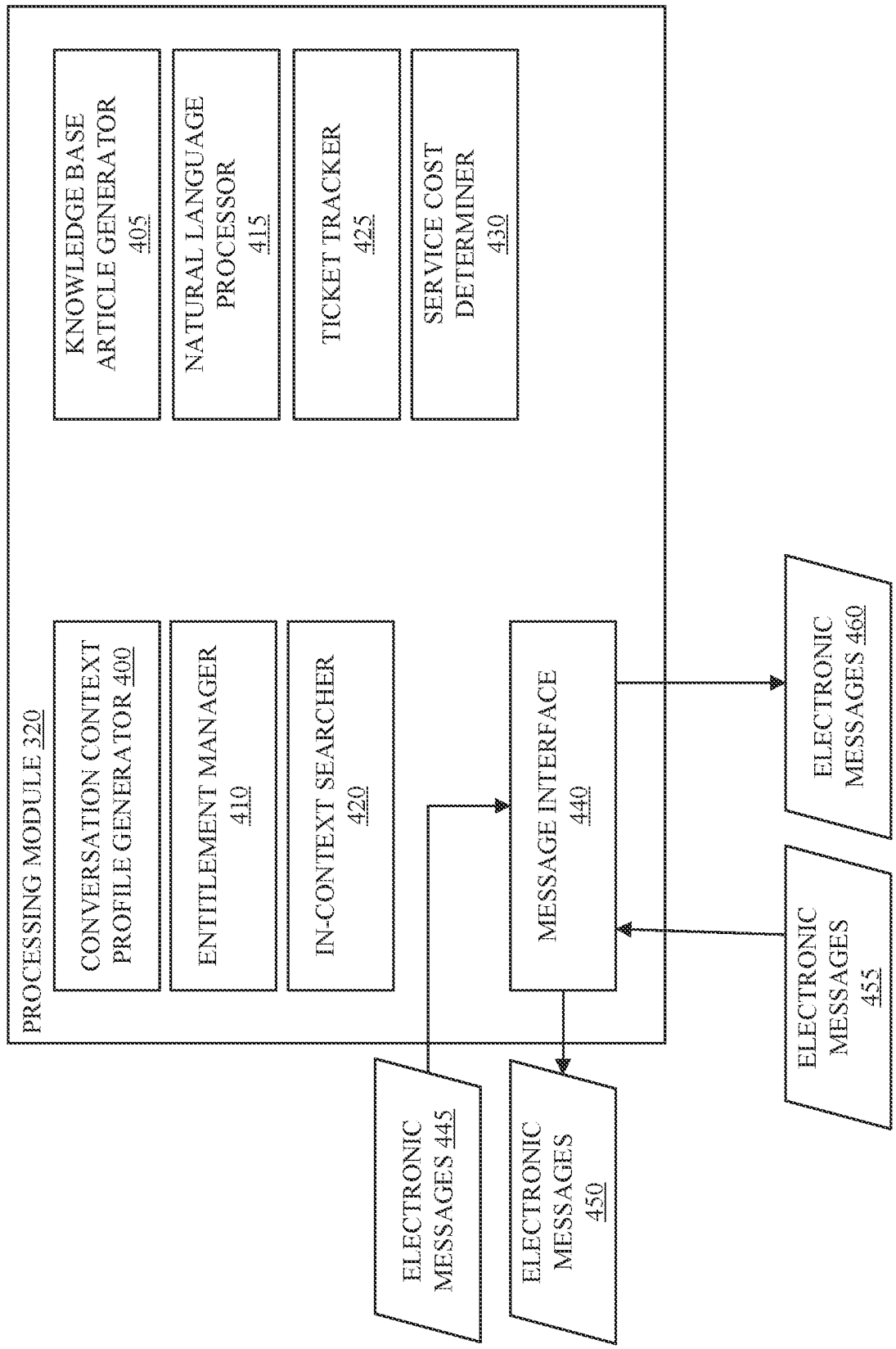
FIG. 4 is an illustration of the example processing module of the example SIB of FIGS. 1 and 3.

FIG. 4 illustrates the example processing module 320 of the example SIB 104 of FIGS. 1 and 3. The example processing module 320 responds to user-submitted electronic messages and searches for applications, resources, and/or information based on conversation context profiles, generates knowledge base articles, tracks and logs ticket information, determines application and/or resource costs, manages entitlement status information, and determines if, in particular situations, human involvement is necessary to process certain user-submitted requests (e.g., requests to access cloud computing resources 202 of FIG. 2). In the illustrated example, the processor module 320 includes an example conversation context profile generator 400, an example knowledge base article generator 405, an example entitlement manager 410, an example natural language processor 415, an example in-context searcher 420, an example ticket tracker 425, an example service cost determiner 430, and an example message interface 440.

The example conversation context profile generator 400 generates and updates conversation context profiles. The example conversation context profile generator 400 retrieves user profiles, group profiles, and/or service profiles from the example user accounts database 118 (FIG. 1) in response to user-submitted electronic messages and subsequently merges the user profiles, the group profiles, and/or the service profiles or portions thereof into conversation context profiles. In the examples disclosed herein, the example SIB 104 (FIG. 1) uses the conversation context profiles to facilitate performing actions and searches for applications, services, and/or information within a scope of the conversation context profiles in response to user-submitted electronic messages. In some examples, the example conversation context profile generator 400 merges profiles by identifying similarities and/or differences between user, group, and service attributes corresponding to user, group, and service profiles, respectively. In other examples, the conversation context profile generator 400 generates conversation context profiles by identifying and/or analyzing conversational workflow archives and/or resource request histories associated with an example user 112a-c.

User, group, and service profiles change over time based on factors such as, for example, the addition of new applications to the example cloud resource management system 106, new users becoming members of the example system 100, changes in user attributes (e.g., changes in computing device and/or operating system, changes in job title, etc.), the addition of new forums and/or support groups, etc. The conversation context profile generator 400 identifies such changes to user, group, and service profiles and continuously updates conversation context profiles based on identified changes. In some examples, the example conversation context profile generator 400 uses machine learning and/or statistical inference techniques to continuously update conversation context profiles. In this manner, information in conversation context profiles can be both inferred from existing user, group, and/or service profile state and can be learned over time.

Figure 5:
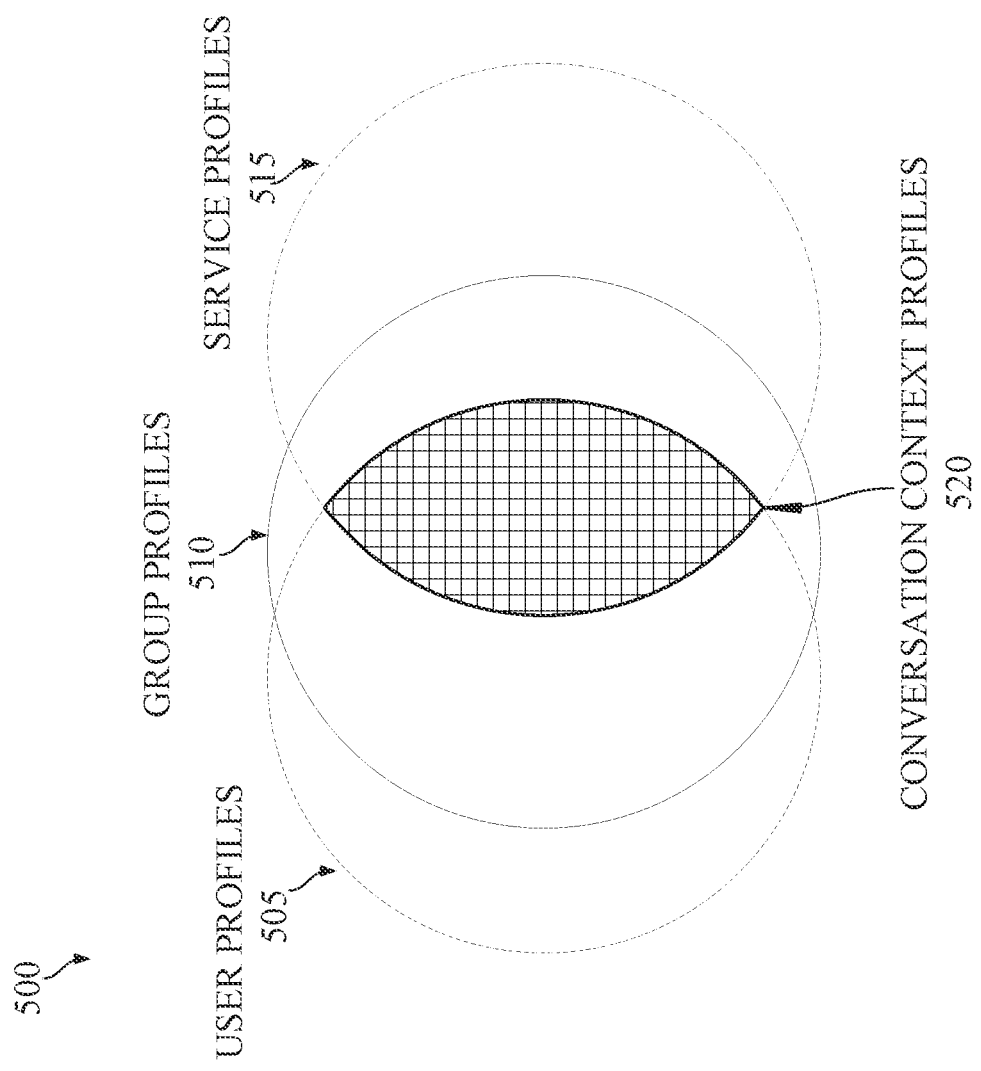
FIG. 5 is an illustration of an example process of generating conversation context profiles.

Turning to FIG. 5, an example manner in which the conversation context profile generator 400 can generate an example conversation context profile 520 is illustrated. In the illustrated example of FIG. 5, the example conversation context profile generator 400 accesses an example user profile 505, an example group profile 510, and an example service profile 520 from the example user accounts database 118 (FIG. 1) in response to reading an electronic messages from a user 112a-c submitted via the social media network 124. In some examples, the conversation context profile generator 400 identifies similarities and/or differences between user, group, and service attributes and analyzes conversational workflow histories associated with the user 112a-c to generate the example conversation context profile 520. In the illustrated example of FIG. 5, the conversation context profile generator 400 identifies an overlap of attributes between the example user profile 505, the example group profile 510, and the example service profile 515 to identify the example conversation context profile 520. In this manner, the example SIB 104 can use the example conversation context profile 520 to determine a scope of search for information and/or a scope of actions to take in response to the electronic message submitted by the user 112a-c as described in more detail below in connection with FIG. 8.

Returning to FIG. 4, the example message interface 440 serves as a point of contact for example users 112a-c and example administrators 116a-c to communicate with the example SIB 104 via conversational workflows, and vice-versa. In the illustrated example, a user 112a-c posts an electronic message 445 to the example social media network 124 (FIG. 1), through which message content is delivered to the example message interface 440. In the illustrated example, the example SIB 104 interprets a user-submitted electronic message 445 and subsequently provides an automated electronic message 450 to the example user 112a-c in response to the user-submitted electronic message 445. In addition, example administrators 116a-c may communicate with the example SIB 104 via administrator-submitted electronic messages 455. For example, when human involvement is necessary to process a user-request for access to a resource or information, administrator-submitted electronic messages 455 can be used by an administrator 116a-c to instruct the example SIB 104 to grant or deny entitlements or authorizations to access the resource and/or information. The example SIB 104 may respond to administrator-submitted electronic messages 455 with electronic messages 460 directed to the example administrators 116a-c.

The example processing module 320 also includes an example natural language processor 415. The example natural language processor 415 receives messages from the example message interface 440. The example natural language processor 415 uses stemming (e.g., reducing words to their word stem, base or root form), chunking (e.g., identifying noun groups, verbs, verb groups, etc.), synonym comparison methods, and/or any other natural language processing method to analyze incoming electronic messages 445/455. In the illustrated example, the natural language processor 415 is provided with spelling correction tools or IT-specific data sets for named entity recognition to improve functionality. The natural language processor 415 of the illustrated example compares terms in electronic messages 445, 455 to keywords corresponding to particular actions that can be taken by the example SIB 104. The natural language processor 415 of the illustrated example also identifies relevant subject-matter (e.g., the topic of the request) in electronic messages 445, 455.

The example natural language processor 415 may utilize an example reference table, such as an example reference table 600 illustrated in FIG. 6, to determine what user-submitted messages are requesting or querying about. The reference table 600 of the illustrated example includes matching terms 602 and matching keywords 604. The example natural language processor 415 identifies matching terms 602 in a user-submitted electronic message 606, and associates the identified matching terms 602 with matching keywords 604. In the illustrated example, the matching keywords 604 are synonymous with corresponding matching terms 602. When the example natural language processor 415 identifies a matching keyword 604, the example SIB 104 uses the matching keyword 604 to determine what action to take. In the illustrated example, if an example user 112a-c submits an electronic message 606 to a particular forum and/or support group that recites "I'm looking for a way to put my application on the cloud," the example natural language processor 415 identifies the matching term 602 "looking" and associates it with the matching keyword 604 "search." In response to finding the matching keyword "search," the example SIB 104 determines to perform a query in the example cloud resource management system 106 using a search string based on the matching keyword 604 "search".

Returning to FIG. 4, the example in-context searcher 420 retrieves and searches for resources and/or information in the cloud computing system 102. The example in-context searcher 420 also analyzes search-related keywords in electronic messages and accesses profiles to determine a search scope. In some examples, a search scope constrains the search to resources and/or information that a user 112a-c is authorized to access. In some examples, the example in-context searcher 420 constrains the search scope to resources and/or information in the cloud computing system 102 using conversation context profiles such as the conversation context profile 520 of FIG. 5. The example in-context searcher 420 also translates terms in electronic messages to identify terms that users 112a-c are interested in for performing the searches for resources and/or information. The example in-context searcher 420 is discussed in more detail below in connection with the illustrated example of FIG. 8.

The example knowledge base article generator 405 generates knowledge base articles. The example knowledge base article generator 405 implements information-harvesting techniques that use user-satisfaction information to collect information from social media responses 126a-c posted to forums and/or support groups. For example, the example knowledge base article generator 405 further identifies social media responses 126a-c in forums and/or support group message boards that are relevant to questions or issues frequently submitted by users 112a-c and that have relatively high user-satisfaction indicators. When the knowledge base article generator 405 determines that a social media response 126a-c satisfies a user-satisfaction threshold, the knowledge base article generator 405 organizes the social media response 126a-c into a knowledge base article format and generates a knowledge base article. In some examples, the knowledge base article is made discoverable in future searches. In examples disclosed herein, a user-satisfaction threshold may be set by an administrator 116a-c to specify how useful a social media response 126a-c must be rated by users 112a-c in order to qualify for being converted into a knowledge base article. In this manner, the example knowledge base article generator 405 converts only ones of the social media responses 126a-c that users 112a-c deem to be helpful.

The example knowledge base article generator 405 stores knowledge base articles in the knowledge base article database 120. In this manner, the SIB 104 can provide knowledge base articles as search results in response to subsequent electronic messages 445, posted by users 112a-c and/or administrators 116a-c. Over time, as more example users 112a-c provide solutions via forums and/or support groups via the same and/or different social media network 124, the example knowledge base article generator 405 generates more knowledge base articles which provides more proven solutions to users and substantially reduces the amount of human involvement by the administrators 116a-c to address user-submitted questions. The example knowledge base article generator 405 is discussed in greater detail below in connection with the illustrated example of FIG. 9.

The example entitlement manager 410 arbitrates whether user access to services can be automatically granted or whether human involvement (e.g., action from an administrator 116a-c) is necessary. In some examples, the entitlement manager 410 accesses the cloud resource management system 106 in response to a request for a cloud computing resource 202 (FIG. 2) and automatically determines if a user 112a-c is entitled access to the cloud computing resource 102. If the user 112a-c is not entitled access, the example entitlement manager 410 may communicate a cloud computing resource denial of access to the user 112a-c. In some examples, the entitlement manager 410 automatically directs the example cloud manager 238 and/or the example resource director 206 of the example cloud resource management system 106 illustrated in FIG. 2 to grant authorization to the user 112a-c. For example, a user profile of the user 112a-c may indicate that the user 112a-c can be automatically granted access to a number of types of resources upon request. Additionally or alternatively, some resources may have attributes indicating that authorization to access them is automatically grantable to any user requesting such authorization. However, in some examples, the entitlement manager 410 may determine that human involvement is necessary and send an electronic message to an example administrator 116a-c to request whether authorization to access the requested resources can be granted to the user 112a-c. The example entitlement manager 410 is discussed in more detail below in connection with the illustrated example of FIG. 10.

The example ticket tracker 425 automatically logs and stores ticket information in the example user accounts database 118 by analyzing and/or extracting information from conversational workflows. For example, the example ticket tracker 425 automatically logs ticket information in the example user accounts database 118 based on information in user-submitted electronic messages 445. In some examples, the example ticket tracker 425 identifies and communicates ticket voids (e.g., missing ticket information) to the example message interface 440. In this manner, the example message interface 440 can query examples users 112a-c via electronic messages 450 for information to fill the ticket voids. For example, the ticket tracker 425 may identify that a description of an IT-related issue is not logged in the example user accounts database 118 and subsequently communicate a corresponding ticket void to the example message interface 440 to query a corresponding example user 112a-c for the missing information. Additionally, the example ticket tracker 425 may use conversation context profiles 520 (FIG. 5) to fill ticket voids without querying a user 112a-c. For example, the ticket tracker 425 may locate user attributes such as the user's name, ticket history, ticket status, etc. from a corresponding user profile in the example user accounts database 118 without querying the example user 112a-c for such information. The example ticket tracker 425 substantially reduces or eliminates the need for users 112a-c to fill in a significantly large number of data fields, open multiple applications, and use multiple user interfaces and log-ins to submit ticket information. That is, the example ticket tracker 425 guides users 112a-c through numerous steps to fill out virtual forms by querying the users 112a-c one question at a time using conversational, plain language interactions. The example ticket tracker 425 monitors ticket statuses and communicates ticket processing progress to the example user 112a-c, which substantially reduces or eliminates the need for users 112a-c to constantly request ticket status updates.

The example service cost determiner 430 of FIG. 4 identifies and evaluates the costs of the cloud computing resources 202 in the cloud resource management system 106. For example, the costs associated with the cloud computing resources 202 include, for example, cost-per-gigabyte of memory capacity in a database 213, cost-per-gigahertz of a processor in a virtual machine 214, cost-for-use of an application 215, etc. In some examples, the example service cost determiner 430 determines costs associated with cloud computing resources 202 currently allocated to an example user 112a-c upon request. In some examples, the service cost determiner 430 is capable of notifying the user 112a-c if a similar, cheaper cloud computing resource 202 is available. In some examples, the example service cost determiner 430 communicates, integrates, and/or associates with vRealize Business, a VMware product that delivers IT cost data and enables users 112a-c to view costs by department or business. In some examples, the service cost determiner 430 accesses service profiles (e.g., service profiles 515 of FIG. 5) to identify and evaluate cost metrics associated with cloud computing resources 202 in the cloud resource management system 106 that are available to users 112a-c.

Figure 7:
FIG. 7 depicts an example chat session having a message exchange between the example SIB of FIGS. 1 and 3 and a user using social media features of the example system of FIG. 1.

FIG. 7 illustrates an example conversational workflow between an example user 112a-c (FIG. 1) named John, and an example SIB 104 (FIGS. 1 and 3) named Marvin. FIG. 7 depicts how the example SIB 104 processes and responds to user-submitted electronic messages 445 (FIG. 4). In the illustrated example, John submits an electronic message 700 to a help support group or chat session via the example social media interface 124 (FIG. 1). The example SIB 104 interprets keywords in the electronic message 700 using the example natural language processor 415 (FIG. 4). For example, the natural language processor 415 may identify the terms "Windows", "want", and "VM" to determine that a cloud computing resource search for a VM 214 (FIG. 2) running a Microsoft Windows® operating system should be performed. In response to the electronic message 700, the example conversation context profile generator 400 (FIG. 4) may generate a conversation context profile 520 (FIG. 5) based on a user profile 505, a group profile 510, and a service profile 515 of FIG. 5 corresponding to the user named John. For example, the conversation context profile generator 400 may include user attributes from the user profile 505 that indicate that John submitted the electronic message 700 using a PC and is a programmer working for a small software company. The conversation context profile generator 400 may identify that John is a member of a Windows users-interest group (e.g., a user-interest group that discusses topics related to the Microsoft Windows® operating system) and retrieve the group profile 510 associated with the Windows users-interest group. The conversation context profile generator 400 may also retrieve the service profile 515 associated with one or more of the cloud computing resources 202 already allocated to John. For example, the service profile 515 retrieved by the example conversation context generator 400 may indicate that John has three Linux virtual machines deployed from the example catalog 230 of FIG. 2, but no virtual machines having an installed Microsoft Windows® operating system.

The conversation context profile generator 400 may combine attributes from the user profile 505, the group profile 510, and the service profile 515 to generate a conversation context profile 520 that the example in-context searcher 420 may use to identify resources and/or information in the cloud computing system 102. For example, the in-context searcher 420 may use keywords identified by the example natural language processor 415 and the conversation context profile 520 generated by the example conversation context generator 400 to search for applications and resources in the cloud computing system 102. The example in-context searcher 420 may search the example catalog 230 to identify cloud computing resources 202 that satisfy the request. In the illustrated example, the SIB 104 uses the in-context searcher 420 to respond to John with search results via an automated electronic message 705. Subsequently in the illustrated example, John responds with a new user-submitted electronic message 710, selecting one of the options (e.g., "amazon") offered by Marvin, the SIB 104. In the illustrated example, the entitlement manager 410 (FIG. 4) determines that John does not have permission to receive the requested resource. Marvin, the SIB 104 in the illustrated example, subsequently queries John via an electronic message 715 to determine whether John wishes to request entitlement. John responds via an electronic message 720 that he wishes to request entitlement to the requested resources. In response, Marvin either automatically grants John authorization to access the application in the example cloud computing system 102, or seeks human involvement from the administrators 116a-c to grant the authorization for access. In the illustrated example, Marvin, the SIB 104, modifies John's entitlement status via the cloud resource management system 106 and provides John with an electronic message 725 which includes a URL at which the requested resource can be accessed.

Figure 8:
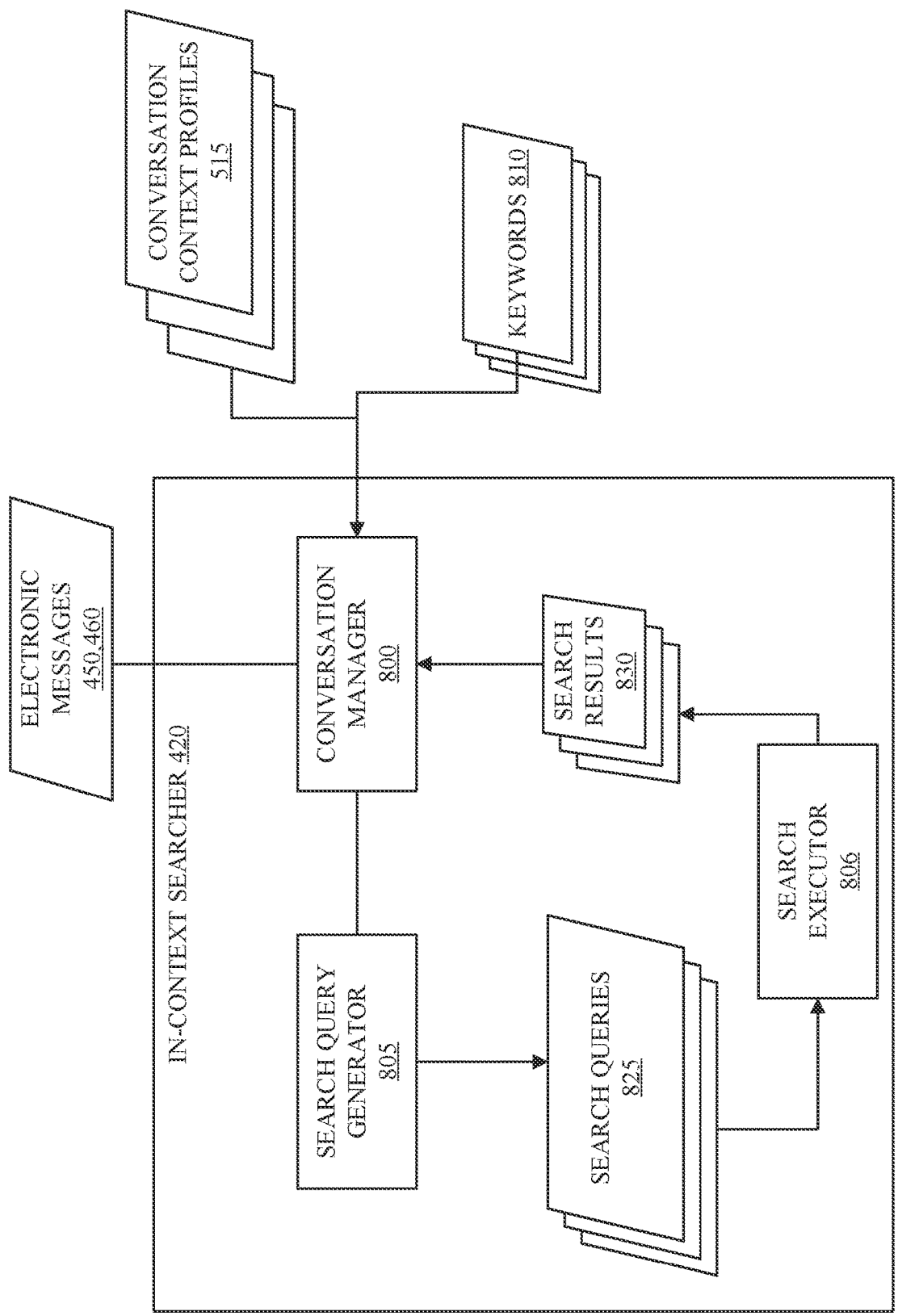
FIG. 8 is an illustration of the example in-context searcher of the example processing module of the example SIB of FIGS. 1, 3, and 4.

FIG. 8 is an example in-context searcher 420 apparatus included in the example processing module 320 illustrated in FIG. 4. The example in-context searcher 420 performs searches for network resources constrained to a search scope in the example cloud computing system 102 based on keywords in user-submitted electronic messages and based on conversation context profiles 520 (FIG. 5). The example in-context searcher 420 apparatus includes an example conversation manager 800 and an example search query generator 805, and an example search executor 806.

The example conversation manager 800 translates terms in electronic messages using keywords and provides search results to examples users 112a-c. In the illustrated example of FIG. 8, the conversation manager 800 accesses profiles 505, 510, 515 (FIG. 5) from the example user accounts database 118 (FIG. 1) and receives example keywords 810 from the natural language processor 415 (FIG. 4). In the illustrated example, the conversation manager 800 receives conversation context profiles 520 (FIG. 5) from the example conversation context profile generator 400. The example conversation manager 800 interprets the example keywords 810 and determines whether a search should be performed for a cloud computing resource 202 (FIG. 2) and/or for other information (e.g., information about a cloud computing resource 202). In some examples, the example conversation manager 800 determines a search scope based on the example conversation context profiles 520.

The example search query generator 805 generates searches for resources and/or information in the example cloud computing system 102. The example search query generator 805 interprets term(s) within user-submitted electronic messages to generate example search queries 825 that the example search executor 806 executes to provide the example conversation manager 800 with example search results 830 (e.g., the names of available applications, resources, and/or information). The example conversation manager 800 communicates the example search results 830 to a user 112a-c via an electronic message 450 and/or to an administrator 116a-c via an electronic message 460.

Figure 9:
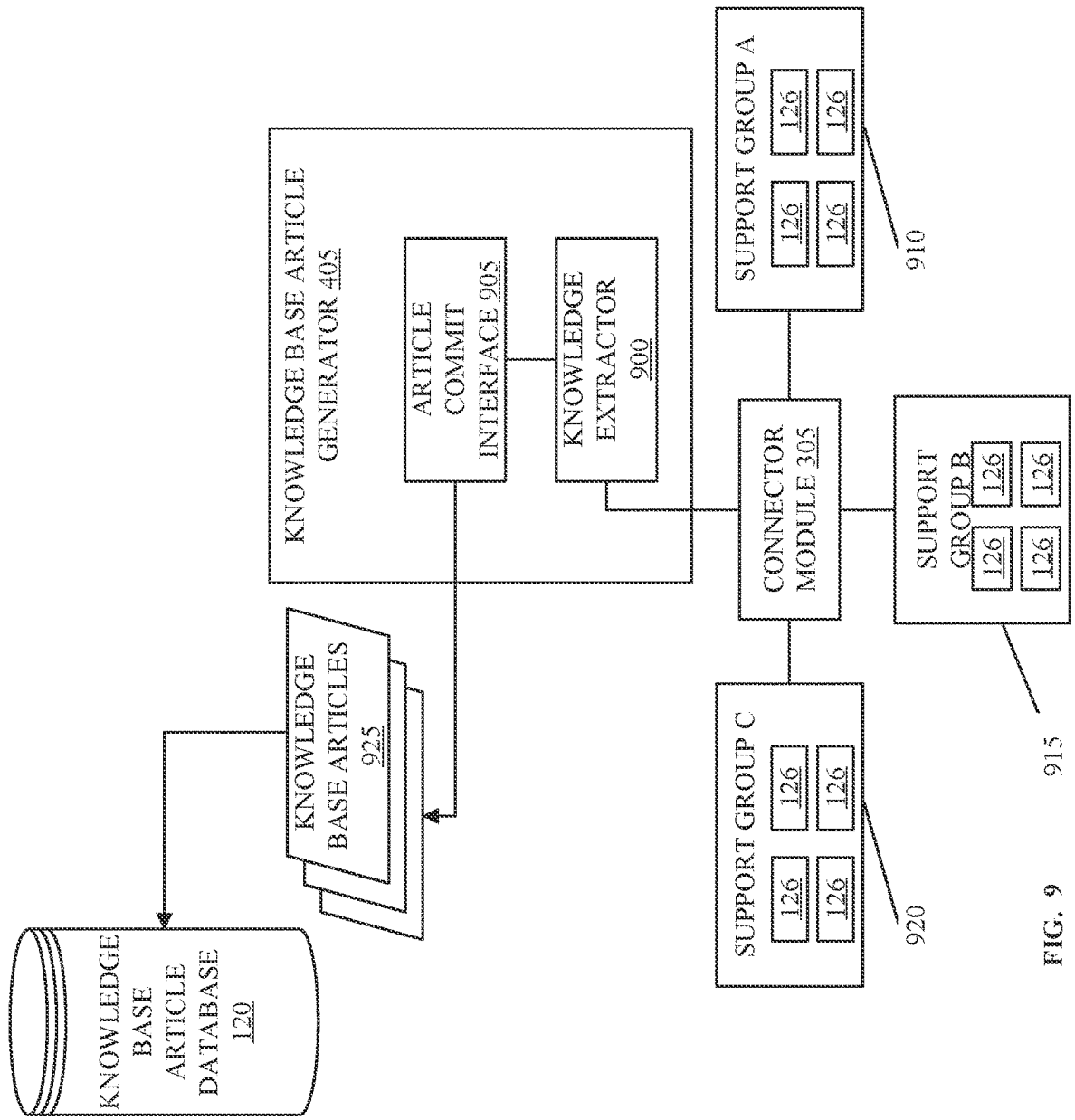
FIG. 9 is an illustration of the example knowledge base article generator that may be used in the example processing module of the example SIB of FIGS. 1, 3, and 4.

FIG. 9 is the example knowledge base article generator apparatus 405 of FIG. 4. The knowledge base article generator 405 generates knowledge base articles based on social media responses 126a-c that satisfy a user-satisfaction threshold. The example knowledge base article generator 405 includes an example knowledge extractor 900 and an example article commit interface 905.

The example knowledge extractor 900 scans social media responses 126a-c (FIG. 1) posted in social media messaging platforms (e.g., the social media network 124 of FIG. 1) such as, for example, support groups, discussion boards, real time text-based chat sessions, etc. The example knowledge extractor 900 selects social media responses 126a-c that satisfy a user-satisfaction threshold. For example, a user-satisfaction threshold may be set to specify that only social media responses 126a-c exhibiting a five-star rating over the past seven months be selected from the example forum and/or support group message board to generate a corresponding knowledge base article. In examples disclosed herein, members of a particular forum and/or support group may provide user-satisfaction indicators (e.g., user rating information and user-acceptance information) to show their satisfaction or dissatisfaction with a particular social media response 126a-c. The example knowledge extractor 900 determines if user-satisfaction indicators associated with a social media response 126a-c satisfies the user-satisfaction threshold. In the illustrated example, the example knowledge extractor 900 selects social media responses 126a-c from example forums and/or support groups (e.g., an example support group A 910, an example support group B 915, and/or an example support group C 920) that satisfy the user-satisfaction threshold.

The example article commit interface 905 generates knowledge base articles based on ones of the social media responses 126a-c selected by the knowledge extractor 900. The example article commit interface 905 receives the selected social media responses 126a-c from the example knowledge extractor 900 and organizes the selected social media responses 126a-c into knowledge base article format. In some examples, the knowledge base article format includes a title, an issue, and a solution. For example, the title could be the title of an initial message posted by a user to submit a question or problem and/or from a social media message/forum postings thread from which the knowledge base article was generated. The issue may be based on an initial message posted by a user to submit a question or problem. The solution may be based on the social media response 126a-c selected for having the relatively highest user-satisfaction indicator. The example article commit interface 905 stores knowledge base articles 925 generated based on selected ones of the social media responses 126a-c in the example knowledge base article database 120. The example knowledge base article database 120 makes the knowledge base articles 925 discoverable for future searches.

Figure 10:
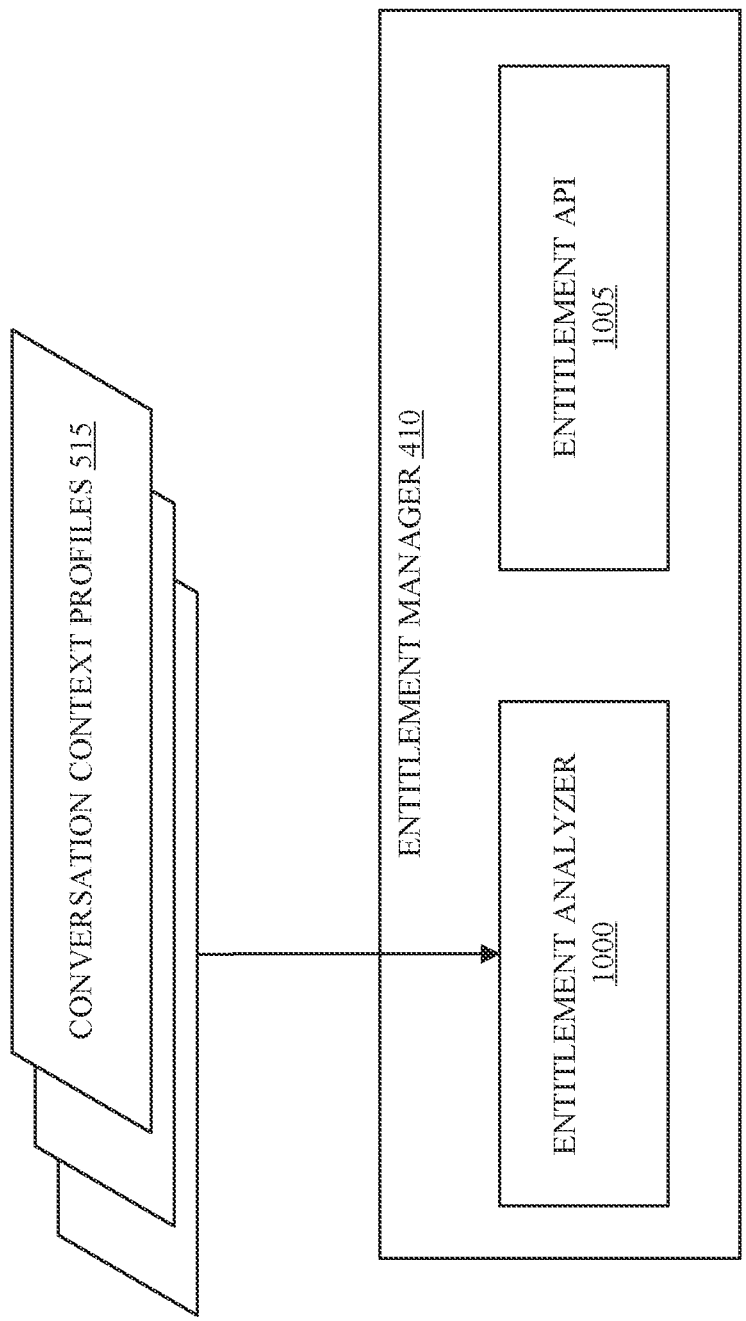
FIG. 10 is an illustration of the example entitlement manager apparatus that may be used in the example processing module of the example SIB of FIGS. 1, 3 and 4.

FIG. 10 is the example entitlement manager 410 implemented in the example processing module 320 as illustrated in FIG. 4. The example entitlement manager 410 arbitrates whether user authorization to access information and/or cloud computing resources 202 can be automatically granted by the SIB 104 (FIG. 1) or whether human involvement from the administrators 116a-c is necessary to grant such authorizations. The example entitlement manager 410 includes an example entitlement analyzer 1000 and an example entitlement API 1005.

The example entitlement analyzer 1000 may access the cloud resource management system 106 (FIGS. 1 and 2) to determine whether an example user 112a-c is entitled to access a cloud computing resource 202 and/or other information available via the cloud resource management system 106 and/or the knowledge base article database 120. In the illustrated example, the entitlement analyzer 1000 identifies user entitlement statuses associated with the cloud computing resources 202 identified in the example catalog 230 of the cloud resource management system 106 and determines whether the example user 112a-c is entitled to access cloud computing resources 202 identified in the example catalog 230. In the illustrated example of FIG. 10, the example entitlement analyzer 1000 accesses or receives a user profile corresponding to the user 112a-c from the user accounts database 118 to identify information and/or cloud computing resources 202 that the user 112a-c is entitled to access. In some examples, the user profile is associated with a pre-defined policy that defines authorizations and entitlements of the example user 112a-c. The entitlement analyzer 1000 may also determine whether human involvement from an administrator 116a-c is necessary to grant the user 112a-c authorization to access the requested information and/or cloud computing resource 202.

The example entitlement API 1005 automatically directs the example cloud resource management system 106 to authorize provisioning cloud computing resources 202 when the entitlement analyzer 1000 determines that requesting ones of the users 112a-c are authorized to access such cloud computing resources 202. Additionally, the example entitlement API 1005 may automatically change entitlement statuses configured in the example cloud resource management system 106 for corresponding ones of the users 112a-c. For example, the example entitlement API 1005 may determine that a pre-defined policy associated with a user profile indicates that the user 112a-c is eligible to access a cloud computing resource 202 if the example user 112 is first provisioned with a prerequisite (e.g., a virtual machine to support operation of an application). The example API 1005 may also automatically direct the example conversation manager 800 of FIG. 8 to generate and send electronic messages 460 (FIG. 4) to an example administrator 116a-c to request a change in entitlement status so that a user 112a-c can be authorized to access a requested cloud computing resource 202.

While example manners of implementing the example in-context searcher 420, the example knowledge base article generator 405, and the example entitlement manager 410 are illustrated in FIGS. 4, 8, 9, and 10, one or more of the elements, processes and/or devices illustrated in FIGS. 4, 8, 9, and 10 may be combined, divided, re-arranged, omitted, eliminated and/or implemented in any other way. Further, the example conversation manager 800, the example search query generator 805, the example search executor 806, the example knowledge extractor 900, the example article commit interface 905, the example entitlement analyzer 1000, and/or the example entitlement API 1005 and/or more generally the example in-context searcher 420, the example knowledge base article generator 405, and the example entitlement manager 410 may be implemented by hardware, software, firmware and/or any combination of hardware, software and/or firmware. Thus, for example, any of the example conversation manager 800, the example search query generator 805, the example search executor 806, the example knowledge extractor 900, the example article commit interface 905, the example entitlement analyzer 1000, and/or the example entitlement API 1005 could be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example conversation manager 800, the example search query generator 805, the example search executor 806, the example knowledge extractor 900, the example article commit interface 905, the example entitlement analyzer 1000, and/or the example entitlement API 1005 and/or more generally the example in-context searcher 420, the example knowledge base article generator 405, and the example entitlement manager 410 are hereby expressly defined to include a tangible computer readable storage device or storage disk such as a memory, a digital versatile disk (DVD), a compact disk (CD), a Blu-ray disk, etc. storing the software and/or firmware. Further still, the example conversation manager 800, the example search query generator 805, the example search executor 806 the example knowledge extractor 900, the example article commit interface 905, the example entitlement analyzer 1000, and/or the example entitlement API 1005 and/or more generally the example in-context searcher 420, the example knowledge base article generator 405, and the example entitlement manager 410 may include one or more elements, processes and/or devices in addition to, or instead of, those illustrated in FIGS. 4, 8, 9 and 10, and/or may include more than one of any or all of the illustrated elements, processes and devices.

Figure 11:
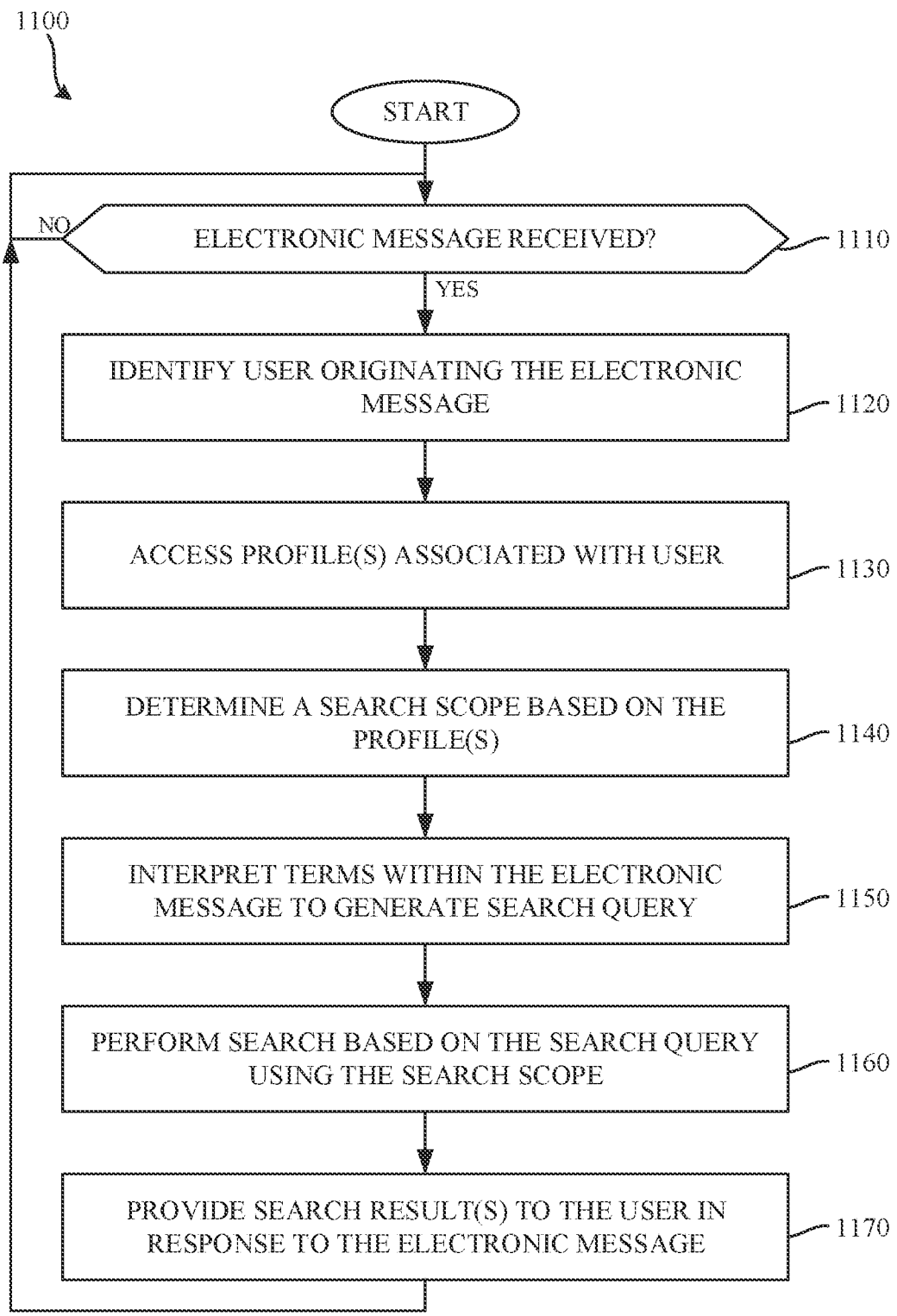
FIG. 11 is a flowchart representative of example machine-readable instructions that may be executed to implement the example in-context searcher of FIG. 8 to perform a search.
Figure 12:
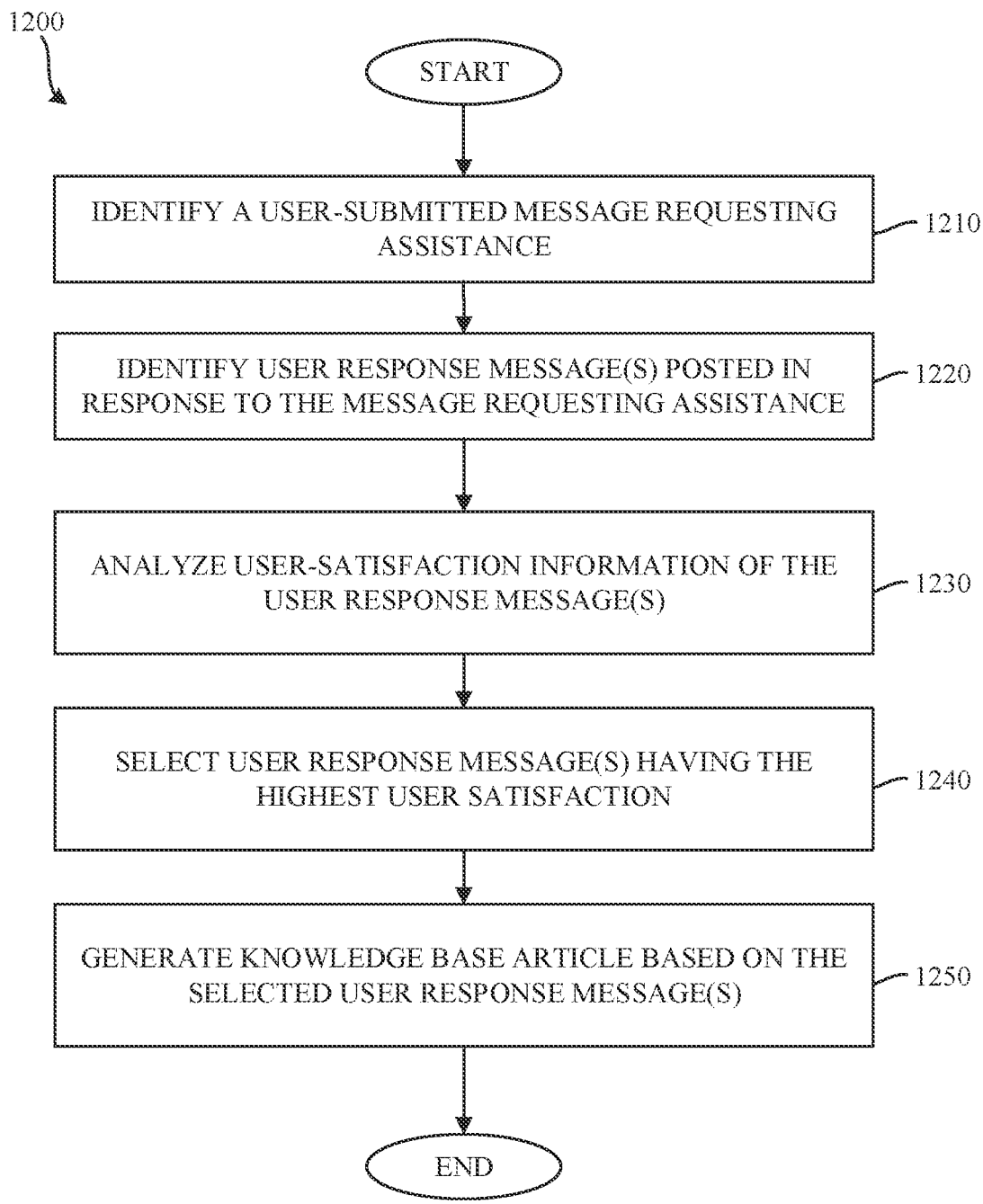
FIG. 12 is a flowchart representative of example machine-readable instructions that may be executed to implement the example knowledge base article generator of FIG. 9 to generate knowledge base articles.
Figure 13:
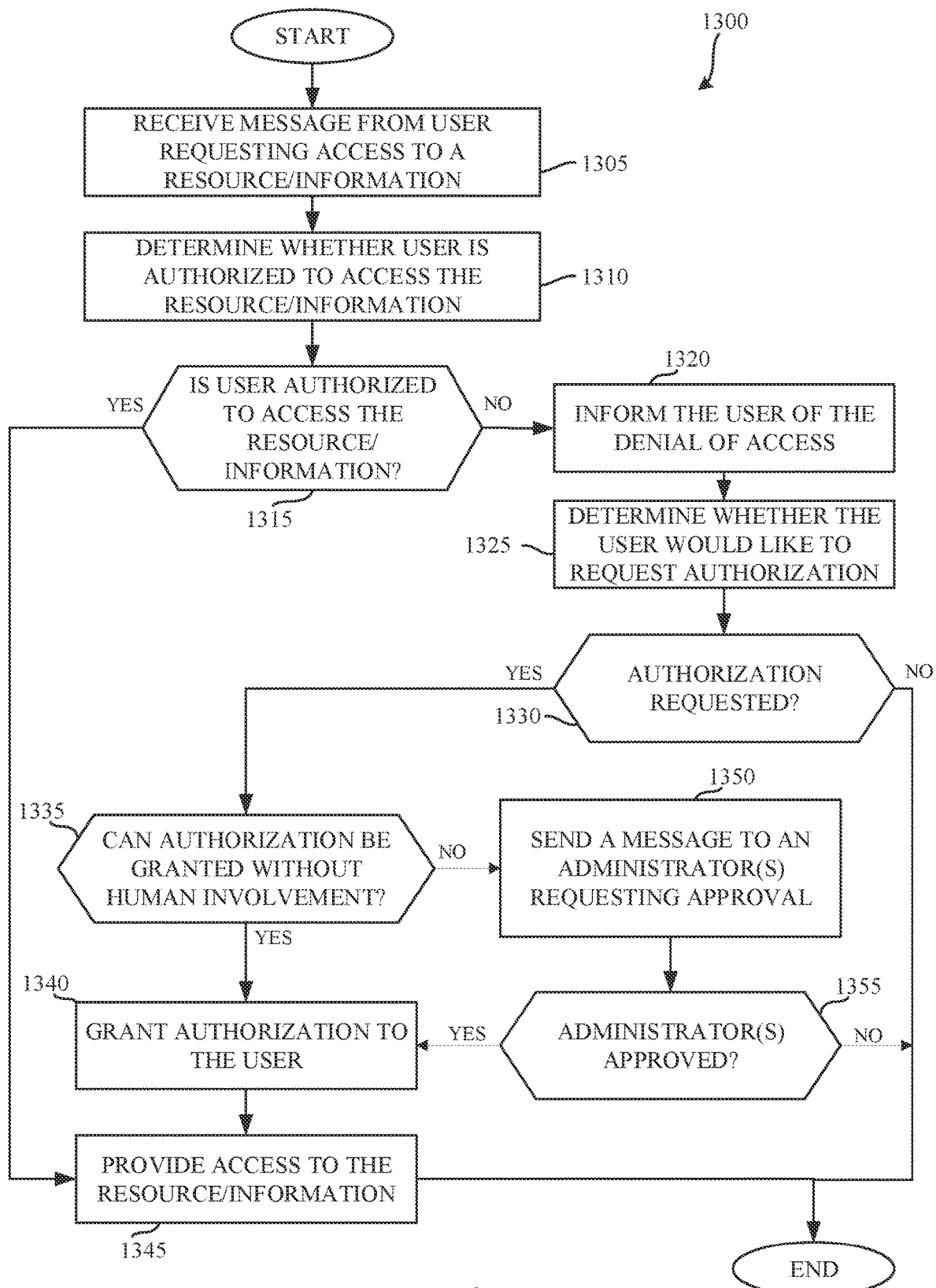
FIG. 13 is a flowchart representative of example machine-readable instructions that may be executed to implement the example entitlement manager of FIG. 10 to arbitrate whether services or service information can be automatically provisioned or whether human involvement is necessary.

Flowcharts representative of example machine readable instructions for implementing the example in-context searcher 420, the example knowledge base article generator 405, and the example entitlement manager 410 of FIGS. 4, 8, 9 and 10 are shown in FIGS. 11-13. In these examples, the machine readable instructions include programs for execution by a processor such as the processor 1412 shown in the example processor platform 1400 discussed below in connection with FIG. 14. The programs may be embodied in software stored on a tangible computer readable storage medium such as a CD-ROM, a floppy disk, a hard drive, a digital versatile disk (DVD), a Blu-ray disk, or a memory associated with processor 1412, but the entire programs and/or parts thereof could alternatively be executed by a device other than processor 1412 and/or embodied in firmware or dedicated hardware. Further, although the example programs are described with reference to the flowcharts illustrated in FIGS. 11-13, many other methods of implementing the example in-context searcher 420, the example knowledge base article generator 405, and the example entitlement manager 410 may alternatively be used. For example, the order of execution of the blocks may be changed, and/or some of the blocks described may be changed, eliminated, or combined.

As mentioned above, the example processes of FIGS. 11-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 11 is a flowchart representative of example machine-readable instructions 1100 that may be executed to implement the example in-context searcher 420 of FIGS. 4 and/or 8. The example program 1100 begins when the example conversation manager 800 receives an electronic message via the example social media network 124 (FIG. 1) (block 1110). In examples disclosed herein, the electronic message includes a query associated with a resource (e.g., a cloud computing resource 202 of FIG. 2) of the cloud computing system 102 (FIG. 1). In some examples, the electronic message is a social media message. In some examples, the example conversation manager 800 determines whether a search query should be performed based on the received electronic message. For example, the conversation manager 800 may determine whether a search for resources (e.g., the cloud computing resources 202 of FIG. 2) and/or information should be performed in the example cloud computing system 102 based on the contents of the electronic message. For example, if search related keywords (e.g., the term "see," "want," "look," "need," variations of those terms, etc.) appear in the electronic message, the example conversation manager 800 may determine that a search is to be performed. If no search is to be performed and/or no electronic message is received (block 1110 returns a result of NO), the example conversation manager 800 awaits a further electronic message(s).

The example conversation manager 800 identifies an originating user 112*a-c* of the electronic message (block 1120). The conversation manager 800 accesses one or more profile(s) associated with the identified user 112*a-c* (block 1130). In examples disclosed herein, the profile is a user profile 505, a group profile 510, a service profile 515, and/or a conversation context profile 520 of FIG. 5 that includes information and/or characteristics associated with the identified user (e.g., age, job title, type of computer used by the user, type of operating system used by the user, user preferences, etc.). In examples disclosed herein, the profile is indicative of cloud computing resources 202 of the cloud computing system 102 that the user 112a-c is authorized to access. In some examples, the profile additionally or alternatively identifies group memberships of the user 112a-c (e.g., a Linux group, a Microsoft Windows® operating system group, an OS X group, etc.), and/or services used by the user 112a-c (e.g., applications used by the user 112a-c, etc.) The example conversation manager 800 determines a search scope based on the profile (block 1140). In examples disclosed herein, the search scope constrains the searched information in the cloud computing system 102 to cloud computing resources 202 and/or information that the user 112a-c is authorized to access.

The example search query generator 805 (FIG. 8) interprets term(s) within the electronic message to generate a search query 825 (FIG. 8) (block 1150). In examples disclosed herein, the term(s) are translated using keywords to more clearly define the terms that the user 112a-c is inquiring about. In some examples, the keywords are identified based on the profile(s) accessed at block 1130. For example, the search query generator 805, upon detecting that a user presented the electronic message "I can't restart my machine" may translate the phrase "my machine" to "Linux" based on the profile indicating that the computer used by the user 112a-c is running a Linux operating system.

The example search executor 806 then performs a search within the cloud computing system 102 based on the search query 825 (block 1160). In examples disclosed herein, the search is constrained to information within the search scope determined at block 1160. That is, the search excludes information that is not within the search scope. For example, if a user 112a-c uses a Microsoft Windows® operating system device, the search scope may be limited to information concerning Windows computers and may exclude information concerning other types of computers (e.g., Linux computers). The conversation manager 800 provides the example search results 830 (FIG. 8) of the search to the user 112a-c (block 1170). In examples disclosed herein, the search results 830 are provided to the user 112a-c using an electronic message 450 (FIG. 4) as a response via the social media network 124. Control then returns to block 1110 at which the example conversation manager 800 awaits a subsequent electronic message. In some examples, the example process of FIG. 11 ends after block 1170. In such examples, the example process of FIG. 11 may resume upon receipt of another electronic message.

While the illustrated example process 1100 of FIG. 11 is represented as a serial procedure (e.g., one user-submitted electronic message is processed at a time), the example process 1100 of FIG. 11 may be implemented in any other fashion. For example, the example process 1100 of FIG. 11 may be implemented in a parallel fashion such that multiple electronic messages may be processed concurrently.

FIG. 12 is a flowchart representative of example machine-readable instructions 1200 that may be executed to implement the example knowledge base article generator 405 of FIGS. 4 and/or 9 to generate a knowledge base article 925 (FIG. 9). The example program 1200 begins when the example knowledge extractor 900 identifies a user-submitted message requesting assistance posted via the social media network 124 (block 1210). For example, when scanning the social media network 124 in the illustrated example, the example knowledge extractor 900 may scan different types of messages posted in different types of social media messaging platforms such as, for example, support groups, discussion boards, real time text-based chat session, etc. of the cloud computing system 102. However, any other network environment, such as a public network environment, may additionally or alternatively be searched by the knowledge extractor 900.

The example knowledge extractor 900 identifies one or more user response message(s) posted in response to the message requesting assistance (block 1220). For example, the one or more user response message(s) may be from the social media responses 126a-c of FIG. 1. In some examples, the user response message(s) include advice or suggested solutions provided by one or more different users (e.g., ones of the users 112a-c of FIG. 1) of the social media network 124 in response to the requested assistance in the original message requesting assistance.

The example knowledge extractor 900 analyzes user-satisfaction indicators associated with the identified response message(s) (block 1230). In examples disclosed herein, the example knowledge extractor 900 analyzes the user-satisfaction indicators to identify user-ratings and/or user-acceptances of the response message(s). As noted above, in some examples, user-satisfaction indicators may include user-rating information and user-acceptance information. User-acceptance information may be indicative of whether users accept, reject, support, or appreciate solutions and/or responses provided in a forum and/or support group (e.g., "recommendations", quantity of clicks on a user-acceptance icon associated with a response, percentage of users that agree with a response, etc.). User-rating information may be indicative of particular response performance relative to others solutions or responses in a forum and/or support group (e.g., assigning a rating to a response based on a scale from one to ten, applying a five star rating to a particular response, etc.). However, any other approach to analyzing a user-satisfaction of a response message may additionally or alternatively be used.

In examples disclosed herein, the example knowledge extractor 900 selects one of the user response message(s) having a highest user-satisfaction (block 1240). In the illustrated example, the highest user-satisfaction is identified relative to user-satisfaction indicators of other messages of a plurality of user response messages. In the illustrated example, a single user response message is selected. However, in some examples, multiple user response messages may be selected. In some examples, other criteria may additionally and/or alternatively be used for selecting the user response message. For example, a user rating of a user response message may be compared to a user-satisfaction threshold, and the user response message may be selected when the user rating meets or exceeds the user-satisfaction threshold. In some examples, the example knowledge extractor 900 may analyze a user response message using any other suitable criteria to determine whether the user that initially requested assistance found the user response message to be satisfactory.

Using the selected user response message(s), the example article commit interface 905 generates a knowledge base article (block 1250). In some examples, the article commit interface 905 uses an autonomous computer-executable process to generate the knowledge base article by organizing the selected user response message(s) into a knowledge base article format. In some examples, the knowledge base article format includes a title, an issue, and a solution. In some examples, a title of the message requesting assistance is identified and is used as the title of the knowledge base article. In some examples, the initial message requesting assistance is included in the knowledge base article as the issue addressed by the knowledge base article. Including the message requesting assistance in the knowledge base article enables a user viewing the knowledge base article to quickly identify and/or understand the problem addressed in the knowledge base article. In some examples, the selected user response message(s) are used to form the solution presented in the knowledge base article. Once generated, the knowledge base article may be posted to the knowledge base article database 120 (e.g., by the example article commit interface 905) to, for example, enable users to search and/or otherwise view the knowledge base article. The example process of FIG. 12 then ends.

FIG. 13 is a flowchart representative of example machine-readable instructions 1300 that may be executed to arbitrate whether access to applications, resources, and/or information can be automatically provisioned or whether human involvement is necessary using the example entitlement manager 410 of FIGS. 4 and 10. The example program 1300 begins when the example entitlement analyzer 1000 receives a message from a user 112a-c requesting access to a cloud computing resource and/or information 202 (FIG. 2) (block 1305). In the illustrated example, the message is received via the social media network 124 (FIG. 1). The example entitlement analyzer 1000 determines whether the user 112a-c is authorized to access the cloud computing resource 202 and/or information (block 1310). In examples disclosed herein, the example entitlement analyzer 1000 determines whether the user 112a-c is authorized to access the cloud computing resource 202 and/or information by using an autonomous computer-executable process that does not require human involvement. In some examples, the example entitlement analyzer 1000 accesses the cloud resource management system 106 to determine whether the user 112a-c is entitled to access the cloud computing resource 202 and/or information. If the user 112a-c is entitled to access the cloud computing resource 202 and/or information (block 1315 returns a result of YES), the example entitlement analyzer 1000 provides access to the cloud computing resource 202 and/or information (block 1345). The process 1300 then terminates.

If the user 112a-c is not entitled to access the cloud computing resource 202 (block 1315 returns a result of NO), the example entitlement analyzer 1000 informs the user 112a-c of the denial of access (block 1320). In some examples, the user 112a-c is informed via the social media network 124 that the access cannot be granted. In some examples, the user 112a-c may not be informed of the denial of access.

The example entitlement analyzer 1000 determines whether the user 112a-c would like to request authorization to access the cloud computing resource 202 and/or information (block 1325). In some examples, the example entitlement analyzer 1000 determines whether the user 112a-c would like to request authorization by interacting with the user 112a-c via the social media network 124. The example entitlement analyzer 1000 analyzes the response from the user 112a-c to determine whether the user 112a-c has requested authorization (block 1330). If the user 112a-c has not requested authorization (block 1330 returns a result of NO), the example process 1300 of FIG. 13 terminates.

If the user 112a-c has requested authorization (block 1330 returns a result of YES), the example entitlement analyzer 1000 determines whether authorization can be granted to the user 112a-c without human involvement (block 1335). In examples disclosed herein, the example entitlement analyzer 1000 may grant authorization automatically without human involvement based on pre-defined policies. For example, a pre-defined policy defines grantable authorizations and entitlements of the user 112a-c established by an entity associated with the cloud computing system 102. The example entitlement analyzer 1000 determines whether the example user 112a-c is authorized to access ones of the cloud computing resources 202 and/or information in the example catalog 230 by consulting the pre-defined policy. For example, the example entitlement analyzer 1000 may inspect the pre-defined policy to determine whether the example user 112a-c satisfies necessary user characteristics, attributes, prerequisites, etc. to access a particular requested cloud computing resource 202 and/or information. For example, the example entitlement analyzer 1000 may determine whether the example user 112a-c is entitled to a requested cloud computing resource 202 and/or information based on his or her job title and/or current device operating system. If the example entitlement analyzer 1000 determines that the example user 112a-c is entitled authorization to access requested cloud computing resources 202 and/or information, the example entitlement API 1005 (FIG. 10) directs the example cloud manager 238 (FIG. 2) and/or the example resource director 206 (FIG. 2) of the example cloud resource management system 106 (FIG. 2) to grant authorization to the user 112a-c (block 1340). The user 112a-c is then provided with access to the requested cloud computing resource 202 and/or information (block 1345). In some examples, providing access to the requested cloud computing resource 202 and/or information includes automatically deploying the requested cloud computing resource 202 and/or automatically providing the information to the example user 112 a-c.

In some examples, if the example entitlement analyzer 1000 determines that the example user 112a-c is not currently entitled to access the requested cloud computing resource 202 and/or information, the example entitlement API 1005 determines whether the example user 112a-c can be automatically granted authority for access (block 1335). In some examples, the example user 112 is not currently entitled access to the requested cloud computing resource 202 (e.g., an application), however, the entitlement API 1005 may determine the example pre-defined policy indicates that the user 112a-c would be eligible for access if a pre-requisite for which the user 112a-c is entitled is met. For example, the user 112a-c may not currently be entitled access to a particular Linux application because the user's device does not have a virtual machine supporting the Linux application. Yet, if the virtual machine supporting operation of the Linux application were provisioned to the example user 112a-c (and the user is entitled to access that virtual machine), the example entitlement API 1005 may determine, based on the example pre-defined policy, that the example user 112a-c is eligible for authorized access and may deploy the virtual machine. In some examples, the entitlement API 1005 may automatically modify entitlement status associated with a particular cloud computing resource 202 and/or information in the example cloud resource management system 106.

If the example entitlement analyzer 1000 determines that the example user 112a-c cannot be granted authorization without human involvement to access the requested resource (block 1335 returns a result of NO), the example entitlement API 1005 automatically directs the example conversation manager 800 of FIG. 8 to generate and send an electronic message 460 (FIG. 4) to an administrator 116a-c (FIG. 1) to request a change in entitlement status (block 1350). The example entitlement analyzer 1000 determines whether the administrator 116a-c approves or rejects the requested authorization (block 1355). For example, the administrator 116*a-c* may respond to the example SIB 104 via the social media network 124. If the entitlement analyzer 1000 determines the administrator 116*a-c* approves the requested authorization (block 1355 returns a result of YES), the example entitlement API 1005 (FIG. 10) directs the example cloud manager 238 (FIG. 2) and/or the example resource director 206 (FIG. 2) of the example cloud resource management system 106 (FIG. 2) to grant authorization to the user 112*a-c* (block 1340). The user 112*a-c* is then provided with access to the requested cloud computing resource 202 and/or information (block 1345). If the entitlement analyzer 1000 determines the administrator 116*a-c* rejects the requested change in entitlement status (block 1355 returns a result of NO), the user 112*a-c* is not granted authorization and the example process 1300 of FIG. 13 terminates. In some examples, the example conversation manager 800 may subsequently provide the example user 112*a-c* with the administrator's response (e.g., acceptance or rejection of entitlement status modification).

Figure 14:
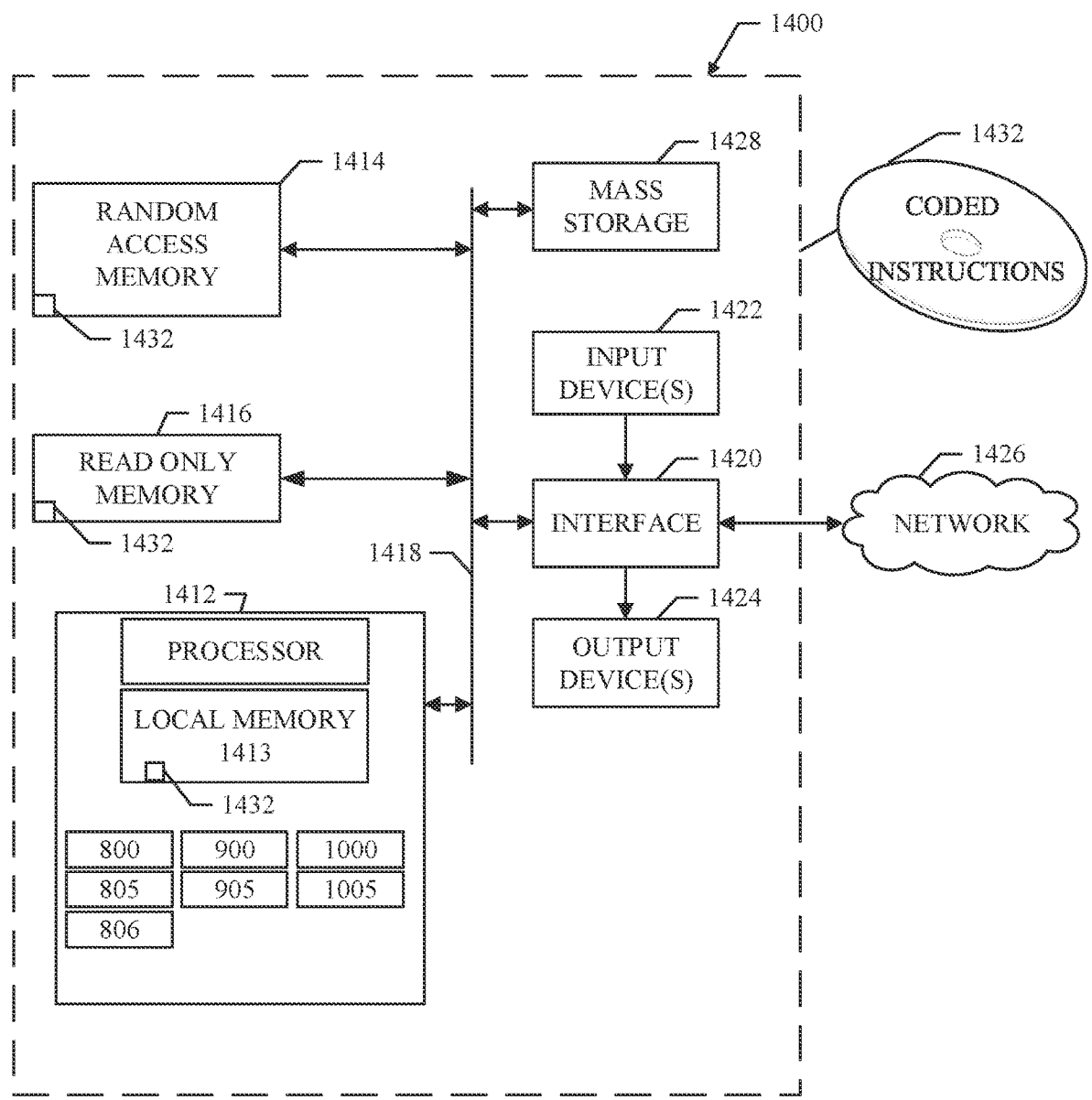
FIG. 14 is an example processor platform that may be used to execute the example machine-readable instructions of FIGS. 11, 12, and/or 13 to implement the example in-context searcher of FIG. 8, the example knowledge base article generator of FIG. 9, and/or the example entitlement manager of FIG. 10.

FIG. 14 is a block diagram of an example processor platform 1400 capable of executing the instructions of FIGS. 11-13 to implement the example in-context searcher 420, the example knowledge base article generator 405, and the example entitlement manager 410 of FIGS. 8, 9 and 10. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. In the illustrated example, the processor 1412 implements the example conversation manager 800, the example search query generator, and the example search executor 806 of FIG. 8. In addition, the example processor 1412 implements the example knowledge extractor 900 and the example article commit interface 905 of FIG. 9. In addition, the example processor 1412 implements the example entitlement manager 1000 and the example entitlement API 1005 of FIG. 10.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 11-13 may be stored in the mass storage device 1428, in the volatile memory 1414, in the non-volatile memory 1416, and/or on a removable tangible computer readable storage medium such as a CD or DVD.

From the foregoing, it will be appreciated examples disclosed herein facilitate performing searches for resources and/or information in a cloud computing system based on contexts of user profiles, group profiles, service profiles and/or message-based conversations. Constraining search queries for resources and/or information to such contexts facilitates providing users with search results that are highly relevant to those users. For example, examples disclosed herein use contexts to perform searches so that search results include information relevant to resources and/or information that are available for use by the user. Constraining search queries based on contexts as disclosed herein also increases the operating efficiencies of processors, databases, data stores and network communications. For example, a processor uses less compute cycles and network bandwidth is preserved by needing to process and/or communicate fewer search results since such search results are limited to a particular context. In addition, accesses to databases and/or data stores are decreased by querying only for information within a particular context.

Additionally, it will be appreciated that the above-disclosed examples facilitate generating knowledge base articles that are discoverable in subsequent searches based on identifying social media responses by users that satisfy a user-satisfaction threshold for usefulness. Generating knowledge base articles using autonomous processes in this manner increases the speed at which a database can be populated with information that is helpful to a community of users. For example, a machine can use criteria such as user-satisfaction indicators and satisfaction thresholds to scan for helpful messages posted in message forums, message boards, chat sessions, or any other social media messaging. The machine can relatively quickly generate knowledge base articles based on those identified helpful messages. Such techniques of generating knowledge base articles improves processor resource efficiency and network efficiency by enabling machines to relatively quickly search for social media messages based on defined parameters (e.g., user-satisfaction indicators, thresholds, etc.) rather than waiting for user inputs via graphical user interfaces associated with prior techniques for generating knowledge base articles. For example, a person inspecting social media messages one by one via a computer over a network to generate knowledge base articles is likely to tie up significant computer resources and network resources during such a social media message inspection process.

In addition, it will be appreciated that the above-disclosed examples arbitrate whether access to resources and/or information can be automatically granted or whether human involvement is necessary to grant authorization to users for such accesses. In prior systems for processing requests to access cloud computing resources, a large number of such requests could relatively easily result in congestion of computer and network resources handling such requests for a large population of users. For example, when users are not authorized to access requested resources, users that are denied such requests are not offered an option to quickly resolve the denial of resource access. As such, prior systems that deny such requests often later receive follow-up requests from users for the same resources. Such follow-up requests use an increased amount of compute power and network resources because users repeatedly submit the same requests. Examples disclosed herein for arbitrating whether access to resources and/or information can be automatically granted or whether human involvement is necessary to grant authorization improve efficiencies of computer and network resource use because a user that is not authorized to access a particular requested resource can request to gain authorization at the time of the same submitted initial submitted request. In this manner, a user does not feel the need to re-submit the same request multiple subsequent times which would amount to using significantly more compute power and network resources to handle such repeated requests.

Methods to interact with users in a cloud computing system are disclosed herein. An example method includes receiving an electronic message from a user via a social media interface, the electronic message including a query associated with a resource of the cloud computing system.

A search scope is determined based on a profile associated with the user, the search scope constrained to first information in the cloud computing system. A search is performed based on the query in the cloud computing system, the search performed on the first information within the search scope. In examples disclosed herein, the search excluding second information that is not within the search scope. Search results of the first information are provided to the user via the social media interface.

In some examples, the profile is indicative of resources that the user is authorized to access in the cloud computing system.

In some examples, the first information to which the search scope is constrained is information associated with resources that the user is authorized to access in the cloud computing system.

In some examples, the method further includes interpreting terms within the electronic message to generate a search query.

In some examples, performing the search is based on the search query.

In some examples, the second information is information associated with resources that the user is not authorized to access in the cloud computing system.

In some examples, the profile is a conversation context profile.

Apparatus to interact with users in a cloud computing system are disclosed herein. An example apparatus includes a social media interface to receive an electronic message from a user, the electronic message including a query associated with a resource of the cloud computing system. The example apparatus includes an in-context searcher to determine a search scope based on a profile associated with the user, the search scope to be constrained to first information in the cloud computing system. The in context searcher is to perform a search based on the query in the cloud computing system, the search performed on the first information within the search scope, and the search excluding second information that is not within the search scope. The in context searcher is to provide search results of the first information to the user.

In some examples, the profile is indicative of resources that the user is authorized to access in the cloud computing system.

In some examples, the first information to which the search scope is constrained is associated with the resources that the user is authorized to access in the cloud computing system.

In some examples, the in-context searcher is to interpret terms within the electronic message to generate a search query.

In some examples, the in-context searcher is to perform the search based on the search query.

In some examples, the second information is associated with resources that the user is not authorized to access in the cloud computing system.

In some examples, the profile is to be a conversation context profile.

Example articles of manufacture to interact with users in a cloud computing system are disclosed herein. The example articles of manufacture include instructions that, when executed, cause a processor to at least receive an electronic message from a user via a social media interface, the electronic message including a query associated with a resource of the cloud computing system. The instructions, when executed, cause the processor to determine a search scope based on a profile associated with the user, the search scope to be constrained to first information in the cloud computing system. The instructions, when executed, cause the processor to perform a search based on the query in the cloud computing system, the search performed on the first information within the search scope, and the search excluding second information that is not within the search scope. The instructions, when executed, cause the processor to provide search results of the first information to the user via the social media interface.

In some examples, the profile is indicative of resources that the user is authorized to access in the cloud computing system.

In some examples, the first information to which the search scope is constrained is associated with resources that the user is authorized to access in the cloud computing system.

In some examples, the instructions further cause the processor to interpret terms within the electronic message to generate a search query.

In some examples, the instructions cause the processor to perform the search based on the search query.

In some examples, the profile is a conversation context profile.

Methods to generate knowledge base articles are disclosed herein. An example method includes analyzing, with a processor, user-satisfaction indicators of a plurality of user response messages in a forum message board of a cloud computing system, the user response messages posted in response to a first message requesting assistance related to a computing resource. One of the user response messages having a highest one of the user-satisfaction indicators relative to others of the plurality of user response messages is selected. A knowledge base article is generated based on the selected user response message.

In some examples, the knowledge base article is generated based on the selected user response message when the highest one of the user-satisfaction indicators of the selected user response message satisfies a threshold.

In some examples, the first message is posted by a first forum user of the forum message board, the user response messages including advice or recommended solutions provided by second forum users of the forum message board in response to the requested assistance in the first message.

In some examples, the first message is posted to the forum message board via a first social media interface that is different from a second social media interface through which the user response messages are posted.

In some examples, generating the knowledge base article includes using an autonomous computer-executable process to organize the selected user response message into a knowledge base article format.

In some examples, the knowledge base article format includes a title, an issue, and a solution.

In some examples, the method includes storing the knowledge base article in a database.

Apparatus to generate knowledge base articles are disclosed herein. An example apparatus includes a knowledge extractor to analyze user-satisfaction indicators of a plurality of user response messages in a forum message board of a cloud computing system, the user response messages posted in response to a first message requesting assistance related to a computing resource. The example knowledge extractor is to select one of the user response messages having a highest one of the user-satisfaction indicators relative to others of the plurality of user response messages. The example apparatus includes an article commit interface to generate a knowledge base article based on the selected user response message.

In some examples, the article commit interface is to generate the knowledge base article based on the selected user response message when the highest one of the user-satisfaction indicators of the selected user response messages satisfies a threshold.

In some examples, the first message is to be posted by a first forum user of the forum message board, the user response messages including advice or recommended solutions provided by second forum users of the forum message board in response to the requested assistance in the first message.

In some examples, the first message is to be posted to the forum message board via a first social media interface that is different from a second social media interface through which the user response messages are posted.

In some examples, the article commit interface is to generate the knowledge base article using an autonomous computer-executable process to organize the selected user response message into a knowledge base article format.

In some examples, the knowledge base article format includes a title, an issue, and a solution.

In some examples, the article commit interface is to store the knowledge base article in a database.

Articles of manufacture comprising computer readable instructions are disclosed herein. In examples disclosed herein, the instructions, when executed, cause a processor to at least analyze user-satisfaction indicators of a plurality of user response messages in a forum message board of a cloud computing system, the user response messages posted in response to a first message requesting assistance related to a computing resource. The instructions, when executed, cause the processor to select one of the user response messages having a highest one of the user-satisfaction indicators relative to others of the plurality of user response messages. The instructions, when executed, cause the processor to generate a knowledge base article based on the selected user response message.

In some examples, the knowledge base article is generated based on the selected user response message when the highest one of the user-satisfaction indicators of the selected user response messages satisfies a threshold.

In some examples, the first message is posted by a first forum user of the forum message board, the user response messages including advice or recommended solutions provided by second forum users of the forum message board in response to the requested assistance in the first message.

In some examples, the first message is posted to the forum message board via a first social media interface that is different from a second social media interface through which the user response messages are posted.

In some examples, the instructions, when executed, cause the processor to generate the knowledge base article using an autonomous computer-executable process to organize the selected user response message into a knowledge base article format.

In some examples, the knowledge base article format includes a title, an issue, and a solution.

Methods to grant authorization to a user for accessing a cloud computing resource are disclosed herein. An example method includes receiving a first message from a user via a social media interface, the first message including a request to access the cloud computing resource. Whether the user is authorized to access the cloud computing resource is determined using an autonomous computer-executable process. When the user is not authorized to access the cloud computing resource, whether the authorization can be automatically granted without human intervention is determined using the autonomous computer-executable process. When the authorization can be automatically granted without human intervention, the authorization is granted to the user. When the authorization cannot be automatically granted, a second message is sent to an administrator to request the human intervention to grant to the user the authorization to access the cloud computing resource.

In some examples, the method includes providing a third message via the social media interface using the autonomous computer-executable process, the third message informing the user that the request is not grantable and asking whether the user would like to obtain authorization to access the cloud computing resource, wherein determining whether the authorization can be automatically granted is performed when a user-selection is received indicating that the user would like to obtain authorization to access the cloud computing resource.

In some examples, determining whether the user is authorized to access the cloud computing resource includes determining whether a user profile of the user indicates that the user is authorized to access the cloud computing resource, the user profile to identify cloud computing resources that the user is authorized to access in a cloud computing system.

In some examples, the method includes accessing a pre-defined policy to determine whether the authorization can be automatically granted without the human intervention.

In some examples, the pre-defined policy is defined by an entity associated with a cloud computing system in which the cloud computing resource is located, the pre-defined policy to specify authorizations that are automatically grantable for a plurality of resources in the cloud computing system.

In some examples, the social media interface is a real-time text-based chat session.

In some examples, the cloud computing resource is at least one of a database, an application, and a virtual machine.

Apparatus to grant authorization to a user for accessing a cloud computing resource are disclosed herein. The example apparatus includes a social media interface to receive a first message from a user, the first message including a request to access the cloud computing resource. The example apparatus includes an entitlement analyzer to determine, using an autonomous computer-executable process, whether the user is authorized to access the cloud computing resource. The entitlement analyzer is to determine, using the autonomous computer-executable process, whether the authorization can be automatically granted without human intervention. The example apparatus includes an entitlement interface to grant the authorization to the user when the authorization can be automatically granted without human intervention. The entitlement interface is to send a second message to an administrator to request the human intervention to grant the authorization to the user to access the cloud computing resource when the authorization cannot be automatically granted.

In some examples, the apparatus includes a conversation manager to provide a third message via the social media interface, the third message informing the user that the request is not grantable and asking whether the user would like to obtain authorization to access the cloud computing resource, wherein the entitlement analyzer determines whether the authorization can be automatically granted when a user-selection is received indicating that the user would like to obtain authorization to access the cloud computing resource.

In some examples, the entitlement analyzer is to determine whether a user profile of the user indicates that the user is authorized to access the cloud computing resource, the user profile to identify cloud computing resources that the user is authorized to access in a cloud computing system.

In some examples, the entitlement analyzer is to access a pre-defined policy to determine whether the authorization can be automatically granted without the human intervention.

In some examples, the pre-defined policy is to be defined by an entity associated with a cloud computing system in which the cloud computing resource is located, the pre-defined policy to specify authorizations that are automatically grantable for a plurality of resources in the cloud computing system.

In some examples, the social media interface is to be a real-time text-based chat session.

In some examples, the cloud computing resource is to be at least one of a database, an application, and a virtual machine.

Articles of manufacture comprising computer readable instructions are disclosed herein. The instructions, when executed, cause a processor to at least receive a first message from a user via a social media interface, the first message including a request to access the cloud computing resource. The instructions, when executed, cause the processor to determine, using an autonomous computer-executable process, whether the user is authorized to access the cloud computing resource. The instructions, when executed, cause the processor to determine, using the autonomous computer-executable process, whether the authorization can be automatically granted without human intervention. The instructions, when executed, cause the processor to grant the authorization to the user when the authorization can be automatically granted without human intervention. The instructions, when executed, cause the processor to send a second message to an administrator to request the human intervention to grant the user the authorization to access the cloud computing resource when the authorization cannot be automatically granted.

In some examples, the instructions further cause a processor to provide a third message via the social media interface using the autonomous computer-executable process, the third message informing the user that the request is not grantable and asking whether the user would like to obtain authorization to access the cloud computing resource. In some examples, the instructions to determine whether the authorization can be automatically granted is performed when a user-selection is received indicating that the user would like to obtain authorization to access the cloud computing resource.

In some examples, the instructions, when executed, cause the processor to determine whether a user profile of the user indicates that the user is authorized to access the cloud computing resource, the user profile to identify cloud computing resources that the user is authorized to access in a cloud computing system.

In some examples, the instructions, when executed, cause the processor to access a pre-defined policy to determine whether the authorization can be automatically granted without the human intervention.

In some examples, the pre-defined policy is defined by an entity associated with a cloud computing system in which the cloud computing resource is located, the pre-defined policy to specify authorizations that are automatically grantable for a plurality of resources in the cloud computing system.

In some examples, the cloud computing resource is at least one of a database, an application, and a virtual machine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to facilitate cloud computing access using a social media network, the apparatus comprising:
   at least one memory;
   instructions; and
   at least one processor to execute the instructions to:
      identify a first cloud computing resource based on an electronic message obtained from a social media interface, the electronic message including a query associated with provisioning of the first cloud computing resource;

generate a conversation context profile based on overlapping attributes from at least one of a user profile, a group profile, or a service profile associated with the query, the user profile based on one or more second cloud computing resources to which a first user has access, the group profile based on one or more of second users including the first user that have access to at least one of the one or more second cloud computing resources, the service profile based on one or more cloud computing services to which the first user has access;

generate a search scope of the query, the search scope to constrain first search information associated with the cloud computing system to the overlapping attributes;

in response to determining that the user profile does not include the first cloud computing resource, grant access to at least one of the first cloud computing resource or second search information associated with the first cloud computing resource based on the conversation context profile, the second search information to be added to the search scope based on the granted access; and provide one or more search results to the first user via the social media interface based on the search scope, the search scope including at least one of a first portion of the first search information or a second portion of the second search information.

2. The apparatus of claim 1, wherein the first cloud computing resource is an operating system, a virtual machine, a networking resource, or a storage resource.

3. The apparatus of claim 1, wherein the at least one processor is to perform a search in a cloud computing resource catalog based on the query, the search performed on the at least one of the first portion of the first search information or the second portion of the second search information in the cloud computing resource catalog within the search scope, and the search excluding third search information in the cloud computing resource catalog that is not within the search scope.

4. The apparatus of claim 1, wherein the one or more of the second users include at least two users including the first user and a third user, and the at least one processor is to:

in response to determining that the first user does not have access to the first cloud computing resource based on the user profile, determine that the third user has access to the first cloud computing resource; and grant the first user access to the first cloud computing resource based on the group profile.

5. The apparatus of claim 1, wherein the one or more search results include a blueprint of an application logical topology, and, in response to a selection of the blueprint, the at least one processor is to:

identify at least one of the one or more second cloud computing resources indicated by the application logical topology;

identify at least one of the one or more cloud computing services indicated by the application logical topology; and generate a deployment plan based on deployment settings indicated by the blueprint and an order of execution of tasks in which the at least one of the one or more second cloud computing resources and the at least one of the one or more cloud computing services are provisioned based on the blueprint.

6. The apparatus of claim 1, wherein the electronic message is a first electronic message, the first user is granted access to the first cloud computing resource based on at least one of the conversation context profile or an attribute of the first cloud computing resource without human involvement, and the at least one processor is to generate a second electronic message to provide a uniform resource locator (URL) to the first user in response to granting the first user access to the first cloud computing resource, the first cloud computing resource accessible at the URL.

7. The apparatus of claim 1, wherein the electronic message is a first electronic message, and the at least one processor is to:

determine whether the first user has access to the first cloud computing resource based on the user profile;

in response to determining that the first user does not have access to the first cloud computing resource based on the user profile, generate a second electronic message informing the first user of a denial of access to the first cloud computing resource; and obtain a third electronic message indicating a request for access to the first cloud computing resource from the first user, the granting of the access to the first cloud computing resource based on the request for access from the first user.

8. A non-transitory computer readable medium comprising instructions that, when executed, cause at least one processor to at least:

identify a first cloud computing resource based on an electronic message obtained from a social media interface, the electronic message including a query associated with provisioning of the first cloud computing resource;

generate a conversation context profile based on overlapping attributes from at least one of a user profile, a group profile, or a service profile associated with the query, the user profile based on one or more second cloud computing resources to which a first user has access, the group profile based on one or more of second users including the first user that have access to at least one of the one or more second cloud computing resources, the service profile based on one or more cloud computing services to which the first user has access;

generate a search scope of the query, the search scope to constrain first search information associated with a cloud computing system to the overlapping attributes;

in response to determining that the user profile does not include the first cloud computing resource, grant access to at least one of the first cloud computing resource or second search information associated with the first cloud computing resource based on the conversation context profile, the second search information to be added to the search scope based on the granted access; and provide one or more search results to the first user via the social media interface based on the search scope, the search scope including at least one of a first portion of the first search information or a second portion of the second search information.

9. The non-transitory computer readable medium of claim 8, wherein the first cloud computing resource is an operating system, a virtual machine, a networking resource, or a storage resource.

10. The non-transitory computer readable medium of claim 8, wherein the instructions, when executed, cause the at least one processor to perform a search in a cloud computing resource catalog based on the query, the search performed on the at least one of the first portion of the first search information or the second portion of the second search information in the cloud computing resource catalog within the search scope, and the search excluding third search information in the cloud computing resource catalog that is not within the search scope.

11. The non-transitory computer readable medium of claim 8, wherein the one or more of the second users include at least two users including the first user and a third user, and the instructions, when executed, cause the at least one processor to:
   in response to determining that the first user does not have access to the first cloud computing resource based on the user profile, determine that the third user has access to the first cloud computing resource; and
   grant the first user access to the first cloud computing resource based on the group profile.

12. The non-transitory computer readable medium of claim 8, wherein the one or more search results include a blueprint of an application logical topology, and, the instructions, when executed, in response to a selection of the blueprint, cause the at least one processor to:
   identify at least one of the one or more second cloud computing resources indicated by the application logical topology;
   identify at least one of the one or more cloud computing services indicated by the application logical topology; and
   generate a deployment plan based on deployment settings indicated by the blueprint and an order of execution of tasks in which the at least one of the one or more second cloud computing resources and the at least one of the one or more cloud computing services are provisioned based on the blueprint.

13. The non-transitory computer readable medium of claim 8, wherein the electronic message is a first electronic message, the first user is granted access to the first cloud computing resource based on at least one of the conversation context profile or an attribute of the first cloud computing resource without human involvement, and the instructions, when executed, cause the at least one processor to generate a second electronic message to provide a uniform resource locator (URL) to the first user in response to granting the first user access to the first cloud computing resource, the first cloud computing resource accessible at the URL.

14. The non-transitory computer readable medium of claim 8, wherein the electronic message is a first electronic message, and the instructions, when executed, cause the at least one processor to:
   determine whether the first user has access to the first cloud computing resource based on the user profile;
   in response to determining that the first user does not have access to the first cloud computing resource based on the user profile, generate a second electronic message informing the first user of a denial of access to the first cloud computing resource; and
   obtain a third electronic message indicating a request for access to the first cloud computing resource from the first user, the granting of the access to the first cloud computing resource based on the request for access from the first user.

15. A method to facilitate cloud computing access using a social media network, the method comprising:
   identifying, by one or more processors, a first cloud computing resource based on an electronic message obtained from a social media interface, the electronic message including a query associated with provisioning of the first cloud computing resource;
   generating, by the one or more processors, a conversation context profile based on overlapping attributes from at least one of a user profile, a group profile, or a service profile associated with the query, the user profile based on one or more second cloud computing resources to which a first user has access, the group profile based on one or more of second users including the first user that have access to at least one of the one or more second cloud computing resources, the service profile based on one or more cloud computing services to which the first user has access;
   generating, by the one or more processors, a search scope of the query, the search scope to constrain first search information associated with the cloud computing system to the overlapping attributes;
   in response to determining that the user profile does not include the first cloud computing resource, granting, by the one or more processors, access to at least one of the first cloud computing resource or second search information associated with the first cloud computing resource based on the conversation context profile, the second search information to be added to the search scope based on the granted access; and
   providing, by the one or more processors, one or more search results to the first user via the social media interface based on the search scope, the search scope including at least one of a first portion of the first search information or a second portion of the second search information.

16. The method of claim 15, further including performing a search in a cloud computing resource catalog based on the query, the search performed on the at least one of the first portion of the first search information or the second portion of the second search information in the cloud computing resource catalog within the search scope, and the search excluding third search information in the cloud computing resource catalog that is not within the search scope.

17. The method of claim 15, wherein the one or more of the second users include at least two users including the first user and a third user, and further including:
   in response to determining that the first user does not have access to the first cloud computing resource based on the user profile, determining that the third user has access to the first cloud computing resource; and
   granting the first user access to the first cloud computing resource based on the group profile.

18. The method of claim 15, wherein the one or more search results include a blueprint of an application logical topology, and further including, in response to a selection of the blueprint:
   identifying at least one of the one or more second cloud computing resources indicated by the application logical topology;
   identifying at least one of the one or more cloud computing services indicated by the application logical topology; and
   generating a deployment plan based on deployment settings indicated by the blueprint and an order of execution of tasks in which the at least one of the one or more second cloud computing resources and the at least one of the one or more cloud computing services are provisioned based on the blueprint.

19. The method of claim 15, wherein the electronic message is a first electronic message, the first user is granted access to the first cloud computing resource based on at least one of the conversation context profile or an attribute of the first cloud computing resource without human involvement, and further including generating a second electronic message to provide a uniform resource locator (URL) to the first user in response to granting the first user access to the first cloud computing resource, the first cloud computing resource accessible at the URL.

20. The method of claim 15, wherein the electronic message is a first electronic message, and further including:
- determining whether the first user has access to the first cloud computing resource based on the user profile;
- in response to determining that the first user does not have access to the cloud computing resource based on the user profile, generating a second electronic message informing the first user of a denial of access to the first cloud computing resource; and
- obtaining a third electronic message indicating a request for access to the first cloud computing resource from the first user, the granting of the access to the first cloud computing resource based on the request for access from the first user.

\* \* \* \* \*